(12) United States Patent
Breese

(10) Patent No.: US 12,143,705 B2
(45) Date of Patent: Nov. 12, 2024

(54) ASSEMBLY AND METHOD FOR SWITCHING DIRECTION OF CAMERA VIEW

(71) Applicant: National University of Singapore, Singapore (SG)

(72) Inventor: Mark Breese, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 18/317,866

(22) Filed: May 15, 2023

(65) Prior Publication Data

US 2023/0283874 A1    Sep. 7, 2023

Related U.S. Application Data

(63) Continuation of application No. 17/312,746, filed as application No. PCT/SG2019/050602 on Dec. 6, 2019, now abandoned.

(30) Foreign Application Priority Data

Dec. 11, 2018 (SG) .......................... 10201811092Y

(51) Int. Cl.
 *H04N 5/335* (2011.01)
 *G02B 27/12* (2006.01)
 (Continued)

(52) U.S. Cl.
 CPC .......... *H04N 23/58* (2023.01); *G02B 27/126* (2013.01); *H04N 23/55* (2023.01); *H04N 23/73* (2023.01)

(58) Field of Classification Search
 CPC .............................. H04N 23/58; G02B 27/126
 See application file for complete search history.

(56) References Cited

U.S. PATENT DOCUMENTS 4,746,203 A * 5/1988 Nishioka ................ G02B 17/02
 600/176
4,846,154 A * 7/1989 MacAnally ........ A61B 1/00165
 349/1

(Continued)

FOREIGN PATENT DOCUMENTS

EP    3147700 A1    3/2017

OTHER PUBLICATIONS

International Search Report and Written Opinion for Application No. PCT/US2019/050602 dated Dec. 2, 2020 (9 pages).

(Continued)

*Primary Examiner* — Gary C Vieaux
(74) *Attorney, Agent, or Firm* — Michael Best & Friedrich LLP

(57) ABSTRACT

An assembly and method of switching direction of camera view. The method comprises disposing a beam splitter element on a camera, the beam splitter element being configured such that first and second beams of light incident on first and second faces, respectively, of the beam splitter element are directable towards an entry lens of the camera; disposing first and second shutter elements in the paths of the first and second beams of light, respectively; and controlling the first and second shutter elements such that one of the first and second shutter elements is in an open state while the other one is in a closed state, and vice-versa.

18 Claims, 18 Drawing Sheets

(51) Int. Cl.
*H04N 23/55* (2023.01)
*H04N 23/58* (2023.01)
*H04N 23/73* (2023.01)

(56) References Cited

U.S. PATENT DOCUMENTS

| | | | | |
|---|---|---|---|---|
| 5,003,385 | A | * | 3/1991 | Sudo .................... H04N 13/341 |
| | | | | 348/E13.043 |
| 5,989,185 | A | * | 11/1999 | Miyazaki ............. A61B 1/0051 |
| | | | | 600/172 |
| 7,830,561 | B2 | | 11/2010 | Zomet et al. |
| 8,928,796 | B2 | | 1/2015 | Van Heugten et al. |
| 8,953,031 | B2 | | 2/2015 | Akui et al. |
| 9,118,900 | B2 | | 8/2015 | Lee |
| 9,128,357 | B2 | | 9/2015 | Chung et al. |
| 9,438,779 | B2 | * | 9/2016 | Yin ...................... G02B 3/0056 |
| 9,782,056 | B2 | | 10/2017 | McDowall |
| 11,112,595 | B2 | | 9/2021 | Takahashi |
| 2008/0267562 | A1 | * | 10/2008 | Wang .............. G02B 26/108 |
| | | | | 362/572 |
| 2009/0112061 | A1 | | 4/2009 | Kim et al. |
| 2012/0105705 | A1 | * | 5/2012 | Kubota ............. G02B 17/0852 |
| | | | | 348/340 |
| 2012/0253121 | A1 | * | 10/2012 | Kitano ................ A61B 1/0623 |
| | | | | 600/109 |
| 2014/0132804 | A1 | | 5/2014 | Guissin et al. |
| 2014/0218478 | A1 | * | 8/2014 | Lang .................... G02B 27/283 |
| | | | | 359/464 |
| 2015/0222886 | A1 | | 8/2015 | Bathiche et al. |
| 2015/0381845 | A1 | | 12/2015 | Song et al. |
| 2017/0214861 | A1 | | 7/2017 | Rachlin et al. |
| 2017/0315370 | A1 | | 11/2017 | Kim |

OTHER PUBLICATIONS

Lester et al., "Ferroelectric liquid crystal device for a single camera stereoscopic endoscope system," Electronics Letters, May 8, 1997, vol. 33, Issue 10, pp. 857-858 (2 pages).

Takei et al., "Angle-Tunable Liquid Wedge Prism Driven by Electrowetting," Journal of Microelectromechananical Systems, Dec. 2007, vol. 16, Issue 6, pp. 1537-1542 (6 pages).

Youwu et al., "Single camera spectral domain polarization-sensitive optical coherence tomography based on orthogonal channels by time divided detection," Optics Communications, Nov. 15, 2017, vol. 403, pp. 162-165 (4 pages).

* cited by examiner

ASSEMBLY AND METHOD FOR SWITCHING DIRECTION OF CAMERA VIEW

CROSS-REFERENCE TO RELATED APPLICATIONS

The application is a continuation application of U.S. patent application Ser. No. 17/312,746 filed Jun. 10, 2021, which is a U.S. national stage entry of International Patent Application No. PCT/SG2019/050602, filed on Dec. 6, 2019, which claims the benefit from Singapore Application No. 10201811092Y, filed Dec. 11, 2018, all of which are incorporated by reference.

FIELD OF INVENTION

The present invention relates broadly to an assembly and method of switching direction of camera view, in particular using shutters.

BACKGROUND

Any mention and/or discussion of prior art throughout the specification should not be considered, in any way, as an admission that this prior art is well known or forms part of common general knowledge in the field.

In order to change the direction of view (DOV) of a camera, which is desirable in many applications of cameras such as in drones, security cameras or borescopes (and all related devices such as endoscopes), there is typically a need to mechanically rotate the camera body to change the DOV. This is a limitation in such applications due to the weight, cost and complexity of additional mechanical components.

For example, many drone cameras are mounted on a gimbal, allowing them to be mechanically rotated to provide a different DOV. This increases the cost, weight and complexity of the drone camera assembly, and introduces uncertainty as to whether the mechanical components will be damaged by any jarring motion of the drone.

Embodiments of the present invention seek to address at least one of the above problems.

SUMMARY

In accordance with a first aspect of the present invention, there is provided an assembly for switching direction of camera view comprising a beam splitter element configured to be disposed on a camera; first and second shutter elements; and a control unit configured to be coupled to the first and second shutter elements; wherein the beam splitter element is configured such that first and second beams of light incident on first and second faces, respectively, of the beam splitter element are directable towards an entry lens of the camera; wherein the first and second shutter elements are configured to be disposed in the paths of the first and second beams of light, respectively; and wherein the control unit is configured to control the first and second shutter elements such that one of the first and second shutter elements is in an open state while the other one is in a closed state, and vice-versa.

In accordance with a second aspect of the present invention, there is provided a method of switching direction of camera view comprising disposing a beam splitter element on a camera, the beam splitter element being configured such that first and second beams of light incident on first and second faces, respectively, of the beam splitter element are directable towards an entry lens of the camera; disposing first and second shutter elements in the paths of the first and second beams of light, respectively; and controlling the first and second shutter elements such that one of the first and second shutter elements is in an open state while the other one is in a closed state, and vice-versa.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 11(a) is a schematic drawing illustrating one DBS, giving two DOV, FIGS. 11(b) and (c) are schematic drawings illustrating two stacked CBS, giving three DOV, noting that the upper CBS is larger in FIG. 11(c) allowing the full FOV to be viewed, FIG. 11(d) shows a photograph corresponding to FIG. 11(c) with larger CBS stacked on top of smaller CBS, and FIG. 11(e) shows a plot of the three DOV achieved with the two CBS geometry in FIG. 11(c) with the DOV having a large angular separation.

FIG. 14(a) is a schematic drawing illustrating an arrangement of three equilateral prisms, with three entrance surfaces, one for each prism, with separate light shutters over each for use in example embodiment. In this case, it is assumed the camera FOV is 60°.

FIG. 14(d) is a schematic drawing illustrating where only the left-side shutter is open, for the arrangement of FIG. 14(a).

FIG. 14(e) illustrates a similar arrangement of prisms compared to FIG. 14(a), but where the central prism has a flat base, allowing light from the top surface to enter it directly without passing through either of the inclined interfaces, for use in example embodiments.

DETAILED DESCRIPTION

Figure 1:
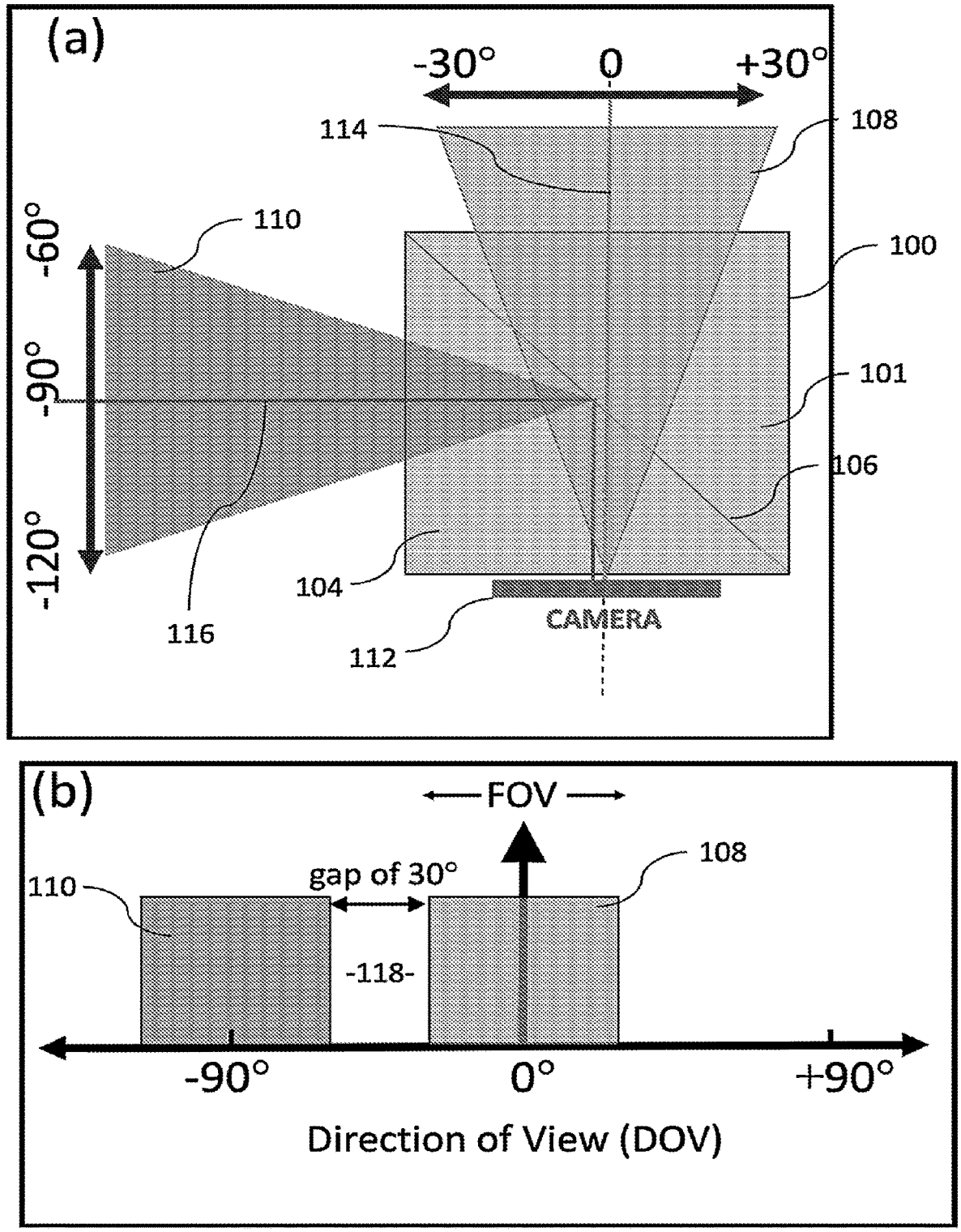
FIG. 1(a) is a schematic drawing illustrating a standard cube beam splitter (CBS) allowing a DOV to enter the camera sensor from the side face which is 90° different from the top face.
FIG. 1(b) illustrates that for a field of view (FOV) of 60° the two DOV illustrated in FIG. 1(a) are separated by a gap of 30° between them.

Embodiments of the present invention apply light shutters to allow/block light from entering selective faces of an arrangement of one of more prisms or other optical elements such as beam splitter plates or mirrors which are placed over the entrance aperture of a camera. In one embodiment, a prism used is a cube beam splitter (CBS) which has two entrance faces separated by 90°, both of which allow an image to fall onto the camera sensor. A larger "family" of non-cube beam splitters (N-CBS) is described in other embodiments, which allow the separation of the two directions of view (DOV) to be increased or decreased from 90°. Thus the separation angle can be chosen such that it matches the camera field of view (FOV), allowing a wide-angle, contiguous view from the two directions according to example embodiments.

Various embodiments of the present invention apply light shutters to be arranged on two (or more) prism entrance faces which allow different DOV to be deflected onto the same camera sensor. The use of liquid crystal shutters according to various example embodiments provides a means of rapidly switching the DOV of a camera simply by applying a small voltage to one or more shutters, so that only one DOV is recorded at any given time. In this manner, there is no need to mechanically rotate the camera body to change the DOV. This is important in many applications of cameras, such as drones security cameras or borescopes (and all related devices such as endoscopes) where the weight, cost and complexity of additional mechanical components is a limitation. Furthermore, various example embodiments can remove the need for a second camera which is aligned to a different DOV, as this direction can be viewed using the switching capability as located on one camera.

The FOV and DOV are stated as the linear angle along the horizontal direction of the angular view unless otherwise stated. The same horizontal direction is taken to be that in which the second side DOV is located, i.e. this is the bend plane.

No account is taken here of any overlap which may be built in between the adjacent FOV for the purposes of stitching them together. This is omitted for clarity and ease of discussion but does not imply that this aspect is unimportant in certain embodiments, and such embodiments are within the scope of the present invention.

In the description below, the term prism is used in relation to example embodiments, but it is noted that embodiments of the present invention can also be implemented using other optical elements such as plate beam splitters or mirrors for larger aperture cameras. As such, the term prism may be regarded as a place holder for such optical elements according to other example embodiments. Some such other example embodiments are further elaborated specifically below.

Liquid crystal (LC) based devices which can block or transmit visible light are established and in wide use since the 1970's or earlier. They feature a thin LC layer (typically a nematic version) which is sandwiched between two parallel glass plates, with crossed linear polarizers on external faces. The LC layer is typically twisted so that it rotates the polarization state of transmitted light by 90°. Depending on the arrangement of the polarizers, with no voltage applied across the LC layer then linearly polarized light transmitted through the first polarizer is rotated through 90° and transmitted through the second polarizer which is oriented perpendicular to the first one. Application of a small voltage (typically several Volts) causes the LC layer to become untwisted so that it no longer rotates light, hence no light is transmitted through the second polarizer.

LC panels are widely used in displays. Early LC panels were severely limited in their frequency response, whereas modern LC layers are capable of rapidly switching their optical transmission state. LC panels which can switch their state on timescale of ten milliseconds are now widely available, finding use in a variety of products such as LC shutter glasses in 3D vision goggles. Furthermore, even faster switching LC panels (tens of microseconds) are now available, though at increased cost. This invention involves some form of light shutter to change state from transmitting to blocking incident light. While LC shutters are assumed throughout this write-up, there are other options such as, but not limited to, mechanical shutters which are also described in one of the embodiments described herein.

Figure 2:
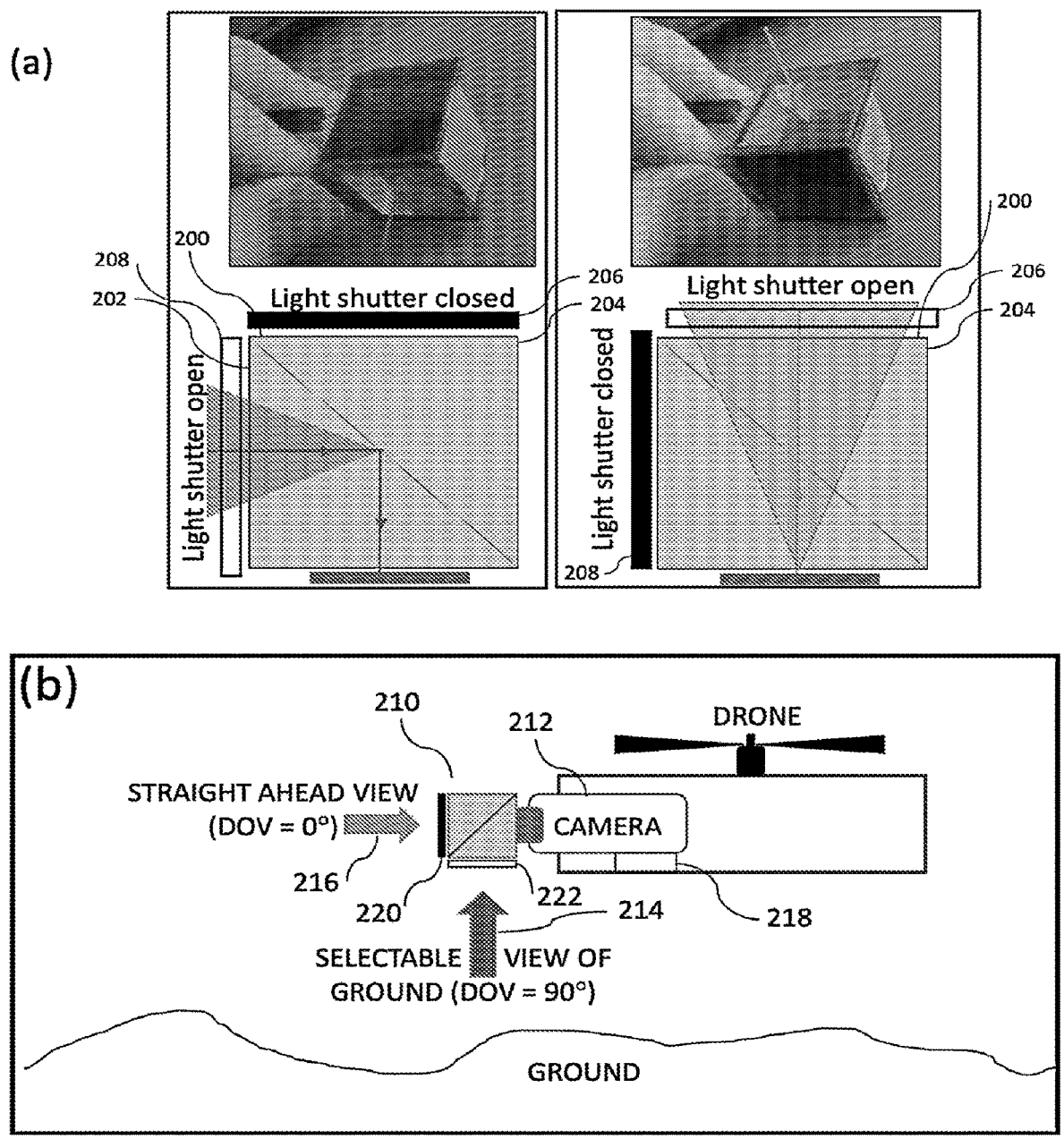
FIG. 2(a) shows photos and schematic drawings illustrating the two entrance faces of a CBS having independently-operated light shutters in front of them, allowing a view through only the side face [left side of FIG. 2(a)] and only from the top face [right side of FIG. 2(a)], according to example embodiments.
FIG. 2(b) is a schematic drawing illustrating an assembly for switching direction of camera view as attached to a fixed-direction drone camera, allowing a second view straight downwards at the ground according to an example embodiment.

With reference to FIG. 1(a), cube beam splitters (CBS) 100 are standard optical components which find many applications in scientific experiments to split a beam of light into two components at right angles to each other. They comprise two right angle prisms 102, 104 joined together along their hypotenuse. The inclined interface 106 has an angle of 45° and has a typical light transmission:rejection ratio of 1:1, though this may be varied as required. One may use the CBS 100 to allow two views 108, 110 at right angles to each other to fall onto one camera 112 sensor. The DOV 114 as viewed through the top face is defined as the straight-ahead direction, DOV=0° and the DOV 116 from the side face has a DOV=−90°. Thus for a "standard" camera FOV of 60°, i.e. ±30°, about the central ray, the two FOVs 108, 110 are separated in angle, with a gap 118 of 30° between them in this example, as also illustrated in FIG. 1(b). It is noted that the two FOV 110, 108 "overlap" on the camera 112 sensor, and may not provide a meaningful image if recorded simultaneously. However, the geometry can be used in example embodiments of the present invention in which shutter elements (not shown) are used to switch between the views during recording, as will now be described for an example embodiment with reference to FIGS. 2(a) and (b).

FIG. 2(a) shows the basic principle of an example embodiment of the present invention, in which the two entrance faces 200, 202 of a CBS 204 have independently-operated light shutters 206, 208 in front of them, covering the full respective faces 200, 202. Without a voltage applied, each shutter 206, 208 transmits light, and with a voltage applied each shutter 206, 208 is switched to a non-transmissive, dark state. Thus on the left side in FIG. 2(a) the top shutter 206 has a voltage applied to it and so light enters the CBS 204 from the side face 202 only. On the right side in FIG. 2(a) the situation is reversed and so light only enters from the top face 200.

As mentioned in the background section, many drone cameras are mounted on a gimbal, allowing them to be mechanically rotated to provide a different DOV. This increases the cost, weight and complexity, and introduces uncertainty as to whether the mechanical components will be damaged by any jarring motion of the drone. In other drones the camera has a fixed DOV, typically parallel to the ground so that only a straight-ahead view is available. In this fixed camera geometry there is no easy way to view in the downwards direction. FIG. 2(b) shows an example embodiment of an optical system 210 as attached to a fixed-direction drone camera 212. This example embodiment allows the drone camera 212 to view a second DOV 214, in this case 90° relative to the straight-ahead view 216, directed straight downwards at the ground. Furthermore, since the switching time is only a fraction of a second, both views 214, 216 can be easily followed without having to wait for a mechanical motion to re-align the camera. A control unit 218 is provided and coupled to first and second shutter elements 220, 222 in the example embodiment. The control unit 218 is configured to control first and second shutter elements 220, 222 such that one of the first and second shutter elements 220, 222 is in an open state while the other one is in a closed state. For example, the first shutter element 220 is closed and the second shutter element 222 is open in one switching state, as indicated in FIG. 2(b), and vice versa in another switching state. The control unit 218 may also be configured to control the image recording and display.

In this example application it may not particularly matter whether the two DOV 214, 216 provide a contiguous FOV. There are other applications where it may be desirable for the second DOV from the side face to join in angle with that of the front face, such as in security cameras or in tracking of distant objects, and this aspect is now considered according to other example embodiments of the present invention. In order to form a contiguous FOV, the difference in in the DOV from the two faces should be equal in magnitude to the FOV of the camera.

Figure 3:
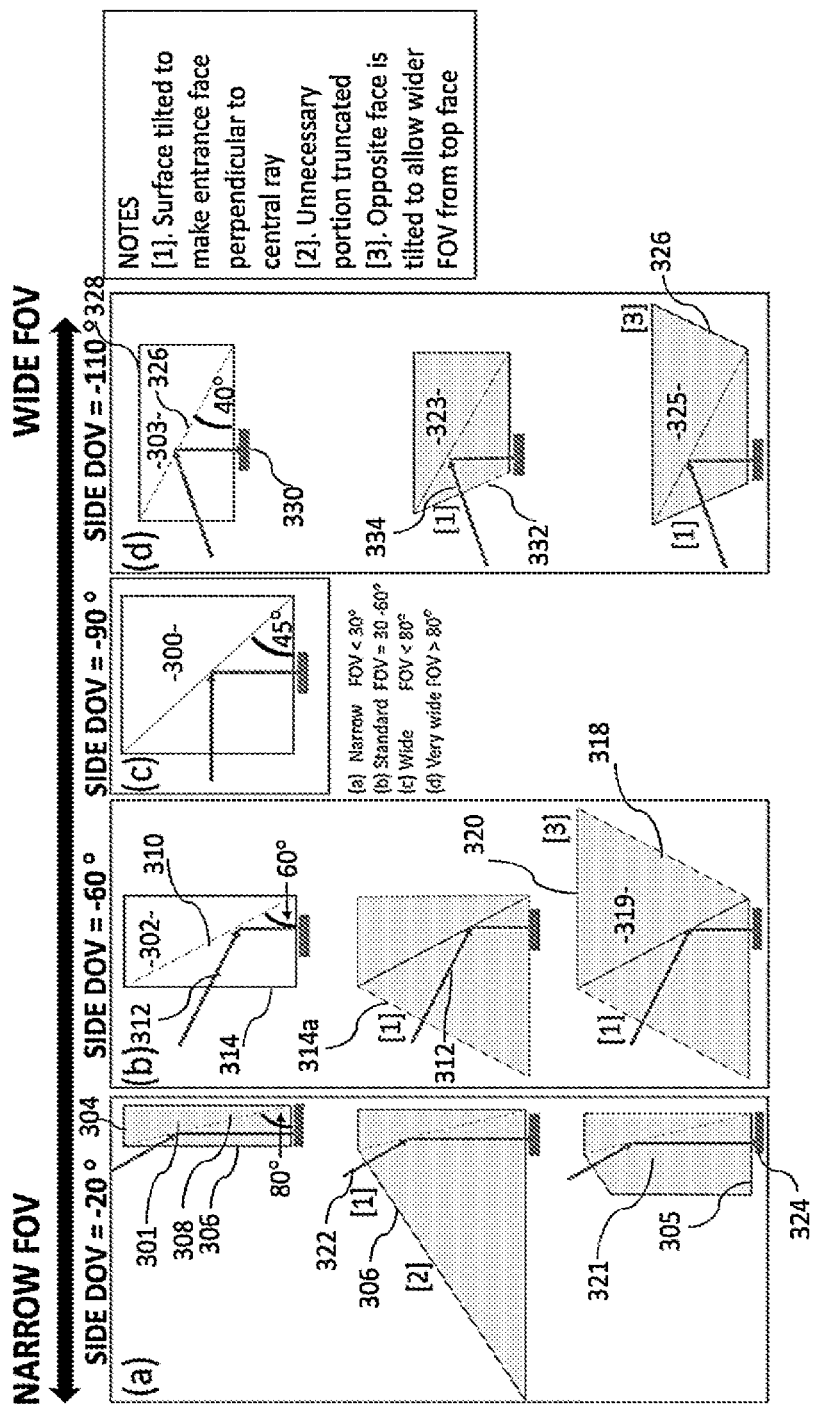
FIGS. 3(a) to (d) show schematic drawings of a "family" of cube and non-cube beam splitters (N-CBS), which allow the difference in DOV between the top and side faces to be customized according to example embodiments, to suit the camera FOV. This, for example, allows the two DOV to form a contiguous wide-angle view according to some example embodiments.

FIG. 3 illustrates how a standard CBS 300 may be considered as a special case within a larger family of non-cube beam splitters (N-CBS), the action of which is to allow two DOV which are not necessarily at right angles to fall onto one camera sensor. The respective top entrance faces of the N-CBS 301 to 303 have the same DOV=0°; the top and bottom faces of the N-CBS 301 to 303 remain parallel, see e.g. 304, 306 of N-CBS 301, resulting in no net deflection of the central ray. However, the DOV of the side face e.g. 306 of N-CBS 301 depends on the angle of the central interface e.g. 308 between the two halves of the N-CBS 301-303. In FIG. 3(c) for the standard CBS 300 where the side DOV=−90° then this central interface has an angle of 45°. In FIG. 3, by convention the DOV of the side face e.g. 306 is given a negative angle for consistency with the coordinate system used throughout this description.

In the top of FIG. 3(b) the central interface 310 has an inclined angle of 60° so that the DOV of the side face 314 is DOV=−60°. The larger inclined angle of the central interface 310 (compared to standard CBS 300) means that instead of a cube profile the geometry has a rectangular profile. However, the central ray 312 entering the side face 314 is not perpendicular to the surface, resulting in refraction effects causing blurring of the image falling on the sensor. To overcome this, in the middle of FIG. 3(b), the left entrance face 314a is angled so as to be perpendicular to the central ray 316, causing the left half of the N-CBS 302 to be an equilateral triangle. In the bottom of FIG. 3(b) the right side face 318 is correspondingly tilted so that the right half of the N-CBS 319 also becomes an equilateral triangle. This helps to increase the FOV as viewed through the top surface 320. The other advantage in making the right half the same as the left half is that it reduces the production cost since the N-CBS 319 is composed of only geometry of prism.

Figure 4:
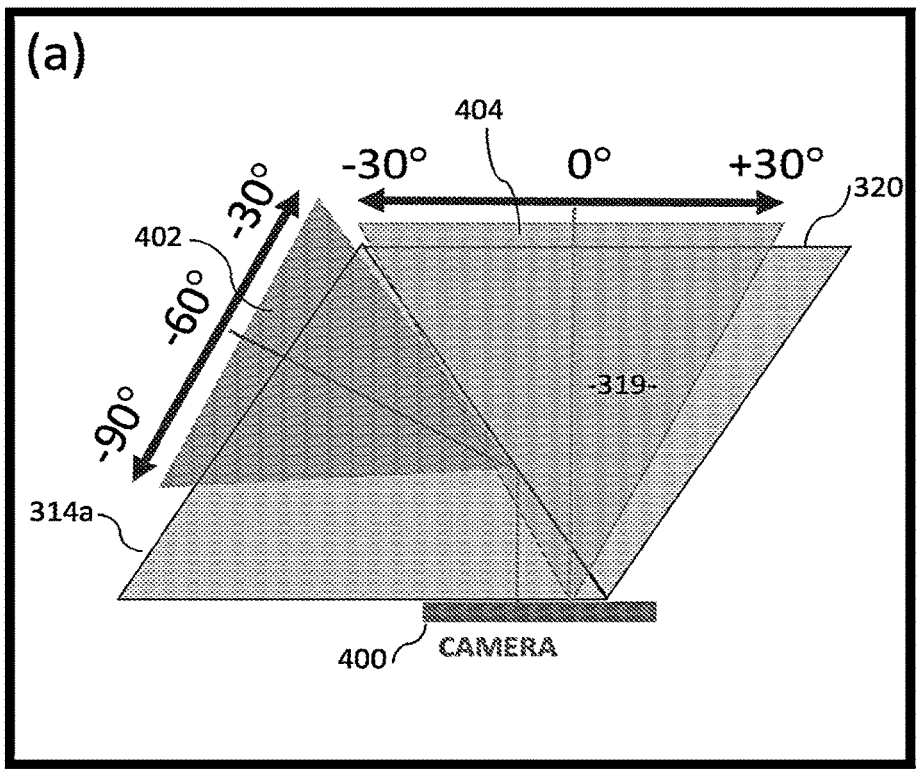
FIG. 4(a) is a schematic drawing illustrating the N-CBS geometry from FIG. 3(b) located on a camera with a FOV of 60°, i.e. equal to the separation in DOV between the two N-CBS entrance faces, according to an example embodiment.
FIG. 4(b) is a schematic drawing illustrating that the two FOV of the assembly of FIG. 4(a) are contiguous, allowing a panoramic view with no gap to be recorded on the same camera sensor, according to an example embodiment.
Figure 4:
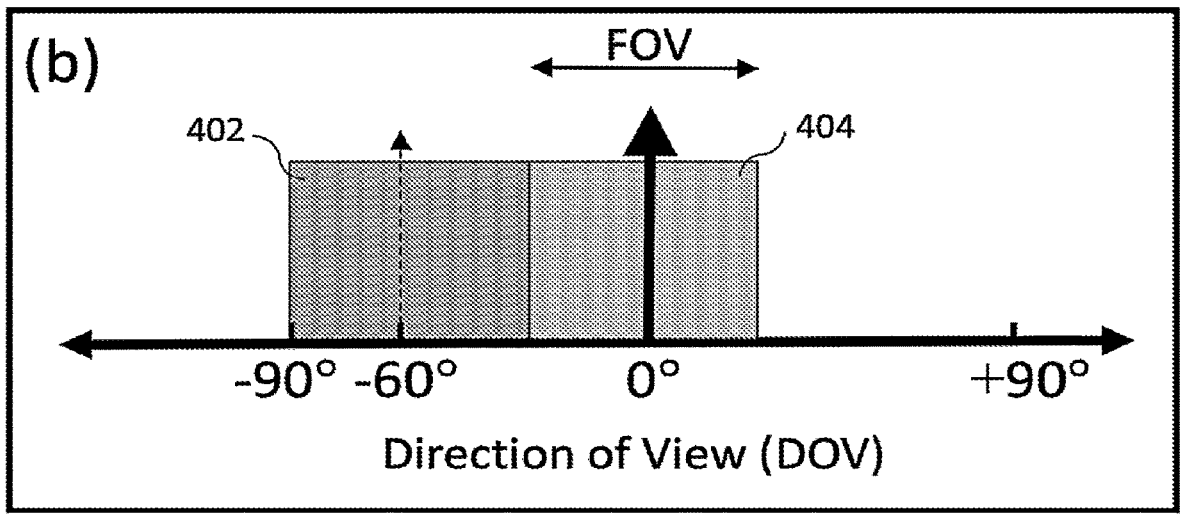

FIG. 4(*a*) shows this geometry of N-CBS 319 located on a camera 400 with a FOV of 60°, i.e. equal to the separation in DOV between the two N-CBS 319 entrance faces 314*a*, 320. Now, as also illustrated in FIG. 4(*b*), the two FOV 402, 404 are contiguous, allowing a panoramic view with no gap to be recorded on the same camera 400 sensor. It is noted that the two FOV 402, 404 "overlap" on the camera 400 sensor, and may not provide a meaningful image if recorded simultaneously. However, the geometry can be used in example embodiments of the present invention in which shutter elements (not shown) are used to switch between the views during recording, compare also the embodiment described above with reference to FIGS. 2(*a*) and (*b*). The top of FIG. 3(*a*) shows the N-CBS 301 geometry for a narrow FOV of 20°, in which the side DOV is located at −20°. This means that the angle of the central interface 308 is 80°, so the N-CBS 301 becomes very tall. In the middle of FIG. 3(*a*) the left entrance surface 306 is again angled so that the central ray 322 is perpendicular to the surface 306. In the bottom of FIG. 3(*a*) this surface 306 is truncated in N-CBS 321 as the outer region plays no role in deflecting the side DOV image into the camera 324.

FIG. 3(*d*) shows the other extreme of a very wide FOV, of 100° in this case. Now the side DOV is ideally centred around −100° and so the angle of the central interface 326 is small, equal to 40°. The N-CBS 303 geometry now has a low aspect ratio, consistent with a larger FOV allowed into the top entrance surface 328. Whether the full FOV can be viewed from the side direction depends on the size and location of the camera 330 with respect to the edge of the housing (not shown) of the camera 330, and the size of the prisms. In the middle of FIG. 3(*d*), the left entrance face 332 is angled so as to be perpendicular to the central ray 334, causing the left half of the N-CBS 323 to be a triangle. In the bottom of FIG. 3(*d*) the right side face 336 is also tilted, in the opposite sense, so that the right half of the N-CBS 325 also becomes a triangle.

FIGS. 3(*a*) to (*d*) thus present a complete family of non-cubic beam splitters (termed N-CBS), with a geometry and inclined angle of the central interface dictated by the requirement to form a contiguous FOV from the two entrance faces. The final profile of the N-CBS may be as shown, though other variations are also possible in different embodiments. The N-CBS extent in the orthogonal, non-bend plane preferably also takes into account the camera FOV, depending on the ratio of the view angles in the two directions. Having described this family of N-CBS for completeness, other combinations of prisms according to different embodiments are discussed below which provide the same capability of a contiguous FOV from two entrance faces. There are situations where one geometry may be preferred over others.

There are many camera applications where a high magnification of a distant object or person is required. Under such conditions the incident light has a narrow FOV entering as large a camera aperture as possible since light collection should be maximized. One problem with using the N-CBS 301 prism in FIG. 3(*a*) placed over a large lens aperture is that it has a high aspect ratio, in other words, it protrudes a lot. To highlight this point, FIG. 5(*a*) shows a comparison for the same diameter of camera 500 aperture, which is fully covered by the prism geometry, for the N-CBS 301 and another arrangement 502 of prisms which is presented in more detail in FIGS. 5(*b*) and (*c*). As evident, the main limitation with the N-CBS 301 is the large distance over which it extends away from the camera 500 surface. In comparison, the prism geometry of arrangement 502 is more compact. In the remaining discussion of embodiments of this invention as applied to a narrow FOV, only this geometry 502 is considered, by way of example, not limitation.

Figure 5:
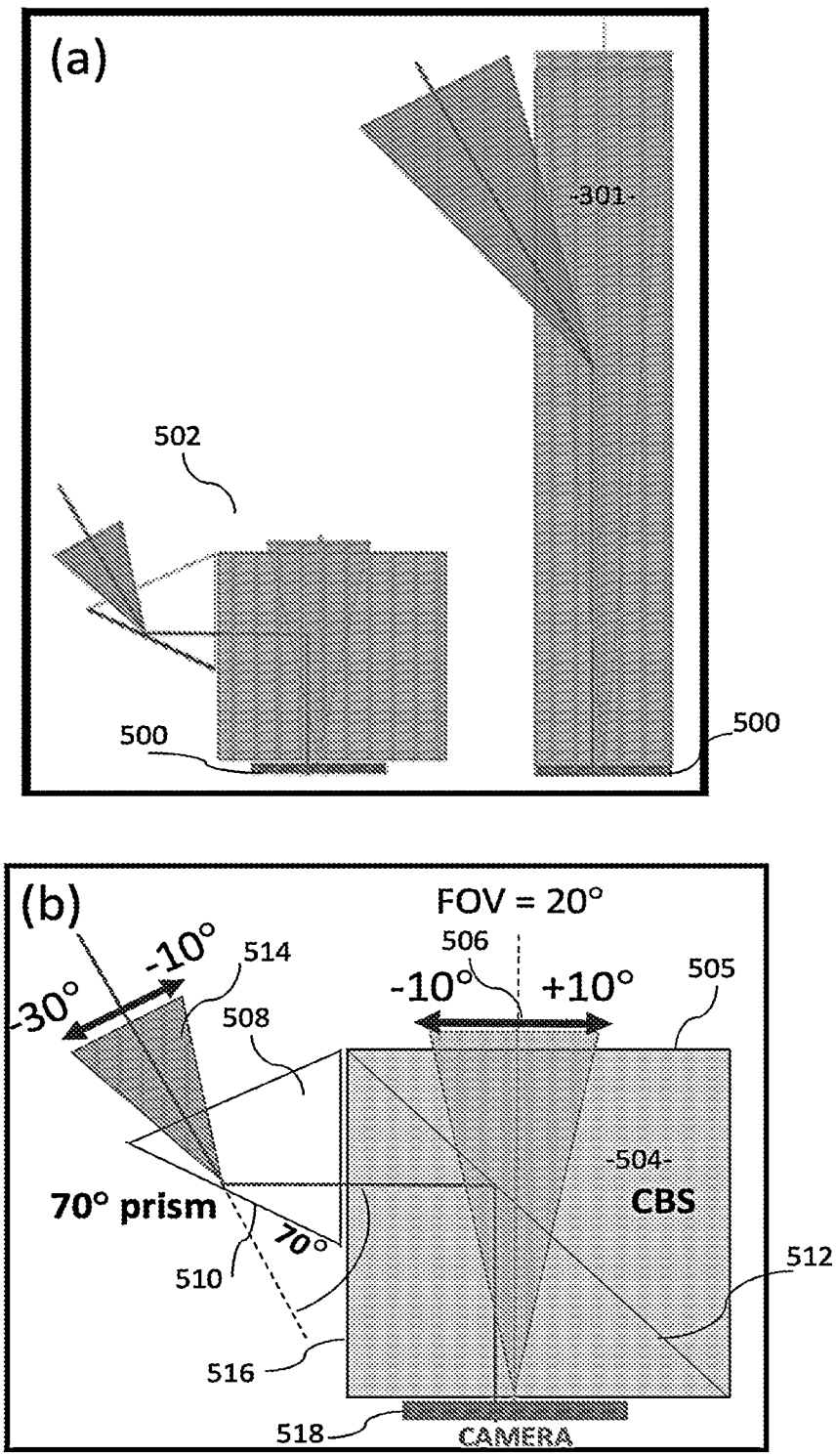
FIG. 5(a) is a schematic drawing illustrating a comparison for the same diameter of camera aperture, for the N-CBS prism geometry from FIG. 3(a) [right side of FIG. 5(a)] and a different arrangement of prisms [left side of FIG. 5(a)], for use in example embodiments.
FIG. 5(b) is a schematic drawing illustrating the arrangement of prisms of FIG. 5(a), left side, namely a combined prism geometry comprising a standard CBS and a triangular prism.
FIG. 5(c) is a schematic drawing illustrating a single light shutter containing separately switchable areas to allow/block light from reaching the two entrance surfaces of the prism geometry of FIG. 5(b), according to an example embodiment.
Figure 5:
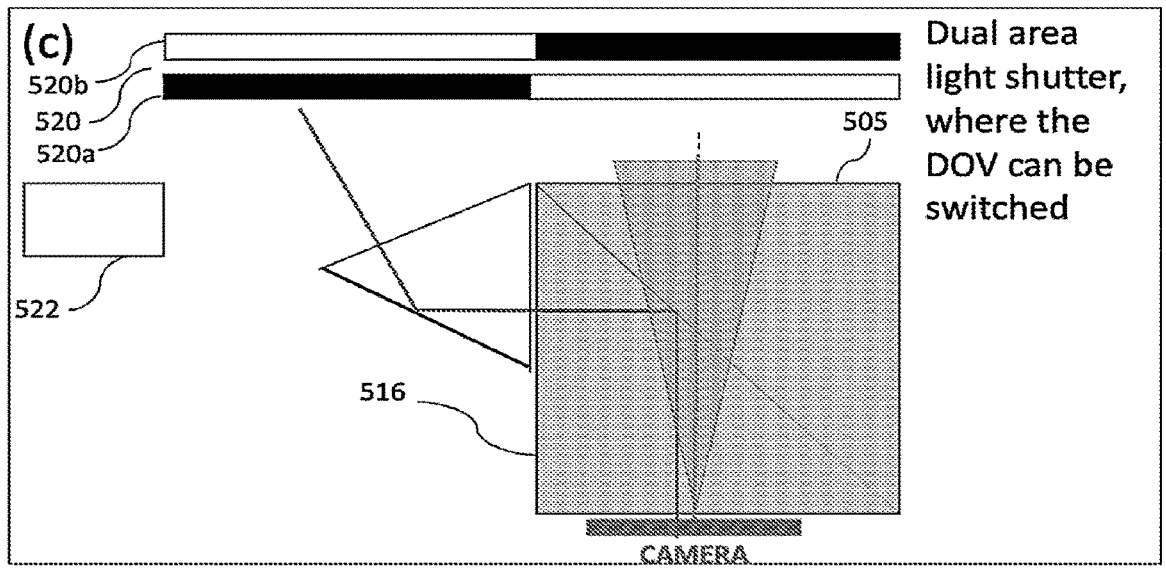

FIG. 5(*b*) describes the principle of this combined prism geometry of arrangement 502, which comprises a standard CBS 504 allowing a view through the top surface 505 over a FOV 506 of ±10°. Attached to the left-hand side of the CBS 504 is a triangular prism 508 with a highly reflective surface 510 (rather than the partially reflective surface 512 for the CBS 504). The side view 514 comprising light from an angular range of −30° to −10° is formed by deflection through both prisms; the triangular prism 508 is encountered first and it deflects the central incident ray through 70° so that it enters the CBS 504 perpendicular to the entrance surface 516. It is then deflected through 90° in the other direction into the camera 518 aperture. Advantages of this approach are that (i) the combined prism geometry of the arrangement 502 is compact and does not significantly protrude, (ii) a single dual area light shutter 520 may suffice to switch light entering from the two entrance surfaces 505 and 516, as illustrated in FIG. 5(*c*). A control unit 522 is provided and coupled to the dual area light shutter 520 in the example embodiment. The control unit 522 is configured to control the single dual area light shutter 520 such that one of areas is in an open state while the other one is in a closed state and vice versa in respective switching states as illustrated at numerals 520*a, b*. The control unit 522 may also be configured to control the image recording and display. A drawback of this approach is that the light path length through the combined prism geometry of the arrangement 502 is twice as long as that through a single prism, which can impose limitations on the FOV which can be transmitted without excessive light loss. In practice it was found to work well up to a FOV of about 40°.

Figure 6:
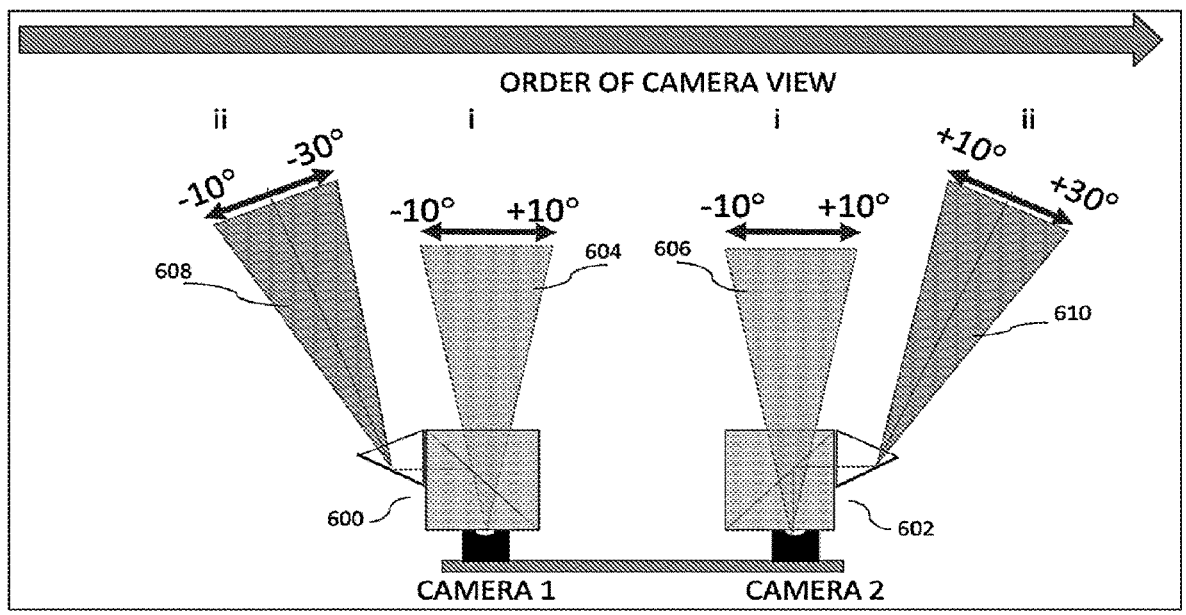
FIG. 6 shows a schematic drawing illustrating the same combined prism arrangements from FIG. 5(b) located on two cameras, with the side-views pointing in opposite directions, for use in an example embodiment.
Figure 7:
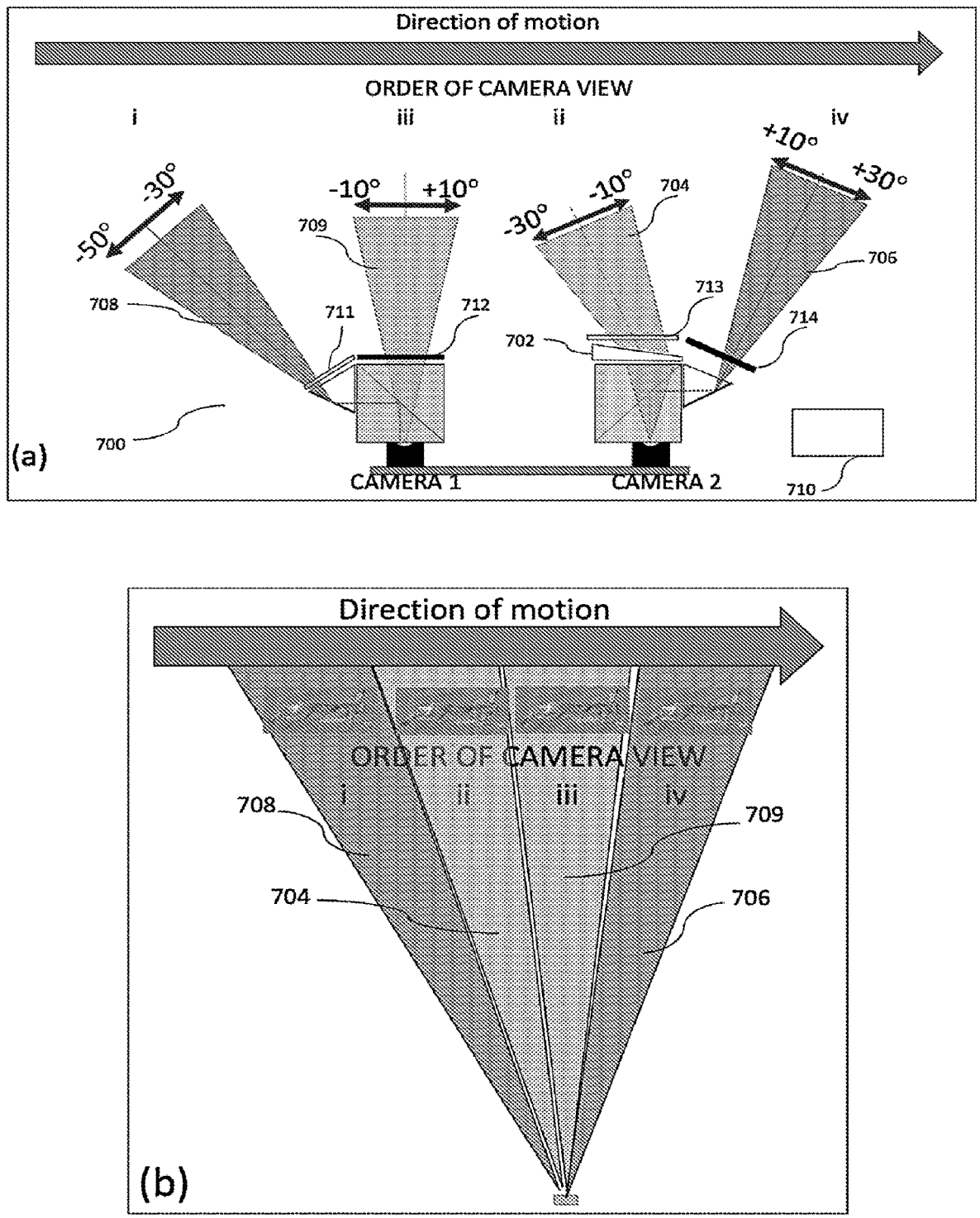
FIGS. 7 (a), (b) are schematic drawings illustrating a different arrangements of prisms located on two cameras, collectively allowing a contiguous field of view over four times that of the single camera FOV to give high magnification tracking of a moving object across the individual FOV of each camera, to the next one, according to an example embodiment.

In other embodiments of the present invention, FIGS. 6 and 7 show how two cameras 1, 2 can be combined to provide new functionalities in conjunction with the direction switching capability. The cameras 1, 2 may be synchronous or asynchronous, depending on the application. Each camera 1, 2 can be read and displayed simultaneously.

In FIG. 6 the same combined prism arrangement 502 from FIG. 5(*b*) is located on each camera 1, 2, and labelled 600 and 602 with the side-views pointing in opposite directions. In normal operation where both top views 604, 606 are recorded, stereo viewing is achieved. When the side views 608, 610 are selected (shutters not shown in FIG. 5(*b*)) together or individually then the user can view over a wider angular range than that which is possible with the stereo viewing mode.

In FIG. 7(*a*) a different arrangement 700 of prisms is shown according to another embodiment, collectively allowing a contiguous field of view over four times that of the single camera FOV to give high magnification tracking of a moving object across the individual FOV of each camera, to the next one. The arrangement 700 of prisms may vary from that shown, which is meant to only indicate the range of options available to change the DOV. For example, in this embodiment camera 2 uses a wedge prism 702 on the top surface to change the DOV 704 by refraction, while the side views 706, 708 and the front view 709 are defined using the same principle of the prism arrangement 502 in FIG. 5(*b*). A control unit 710 is provided and coupled to shutter elements 711-714 in the example embodiment. The control unit 710 is configured to control the shutter elements 711, 712 associated with camera 1 and the shutter elements 713, 714 associated with camera 2, such that one shutter for each camera is in an open state while the other one is in a closed state and vice versa in respective switching states. The control unit 710 may also be configured to control the image recording and display.

Consider FIG. 7(b) where the same camera 1, 2 and prism arrangement 700 is used to track a distant object 710, in this example a rabbit running from left to right across the combined field of view. First, view (i) 708 (camera 1) and view (ii) 704 (camera 2) are displayed side-by-side on a screen (not shown). When the rabbit moves from view (i) to view (ii), camera 1 switches to view (iii) 709 to allow the rabbit to be further tracked. As soon as the rabbit moves from view (ii), camera 2 switches to view (iv) 706.

Figure 8:
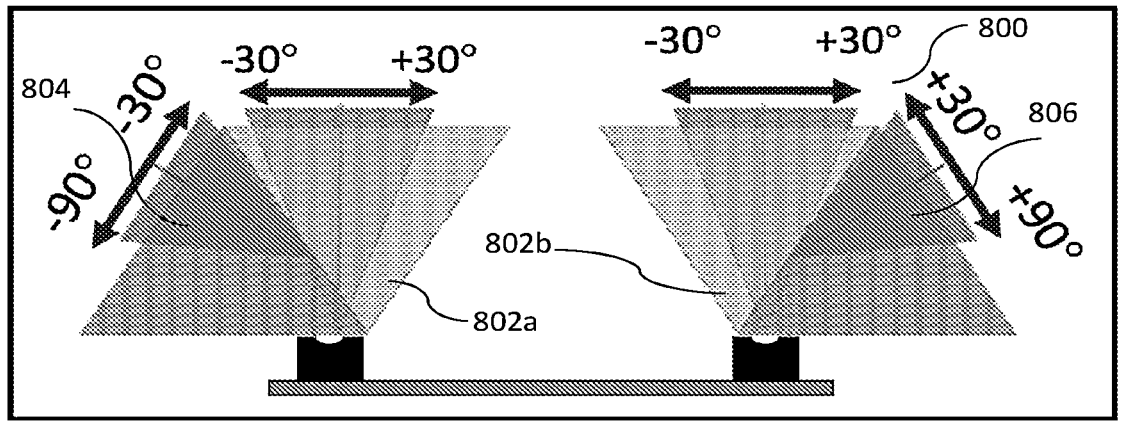
FIG. 8 is a schematic drawing illustrating the N-CBS prism arrangement from FIG. 3(b) located on two cameras which have a standard FOV of 60°, for use in an example embodiment. The top views allow stereo imaging over (−30° to +30°). The N-CBS prisms face in opposite directions so the side views provide a combined FOV over 180°.

FIG. 8 also shows a stereo dual camera example embodiment, here fitted with a different prism arrangement 800. In this embodiment, a medium camera FOV of 60° is assumed, with the N-CBS prisms 302 from FIG. 3(b), 4(b) shown, labelled 802a and 802b in FIG. 8. They face in opposite directions, so that their side views 804, 806 cover a DOV from (−90° to)−30° and (+30° to +90°), respectively. The top views allow stereo imaging over (−30° to +30°), so the combined FOV of the arrangement 800 is over 180°.

Figure 9A:
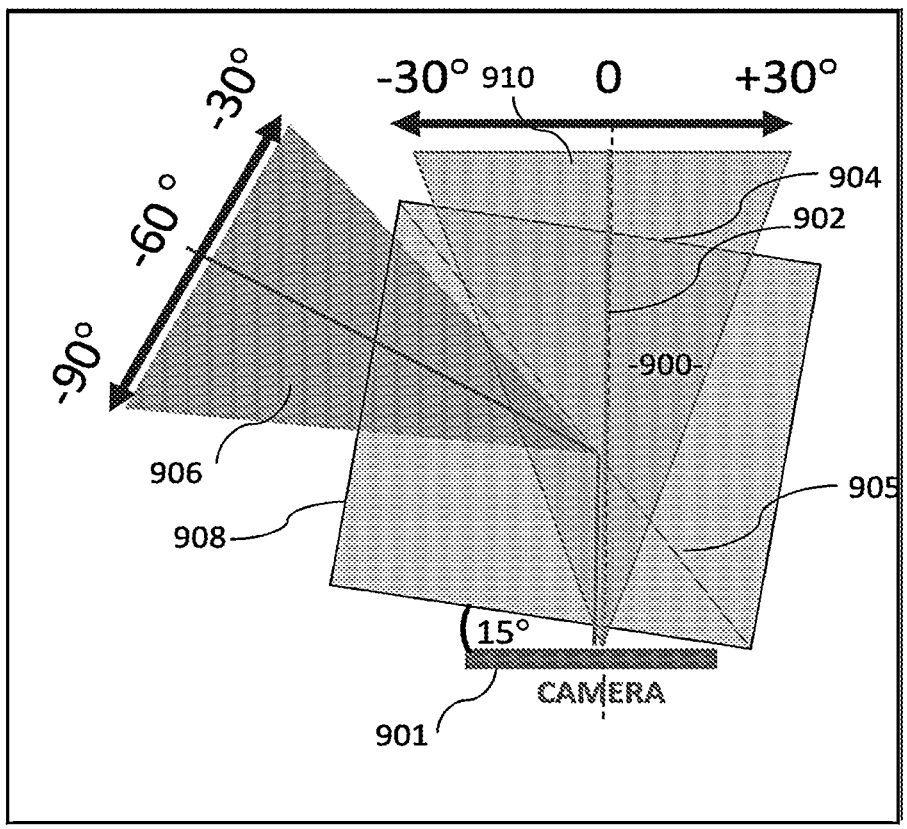
FIGS. 9 (a) and (b) and (c) are schematic drawings illustrating other prism arrangements to achieve the same effect as that shown in FIG. 3(b), for use in example embodiments.

FIG. 9 shows other ways in which the same effect as described in FIG. 3(b), 4(b) can be achieved for a standard FOV of 60° using a CBS. In FIG. 9(a) the CBS 900 is tilted 15° relative to the camera 901. Even though there is no net angular deviation of the central ray 902 passing through the top surface 904, as a drawback there can be significant chromatic distortion induced by the shallow angle of incidence of the entrance angular cone at angles close to −30° in passing through the central inclined boundary 905 of the CBS 900. The FOV 906 from the side face 908 moves towards the straight-ahead direction (i.e. towards that of the top surface 904) so that it joins with the FOV 910 from the top surface 904.

Figure 9B:
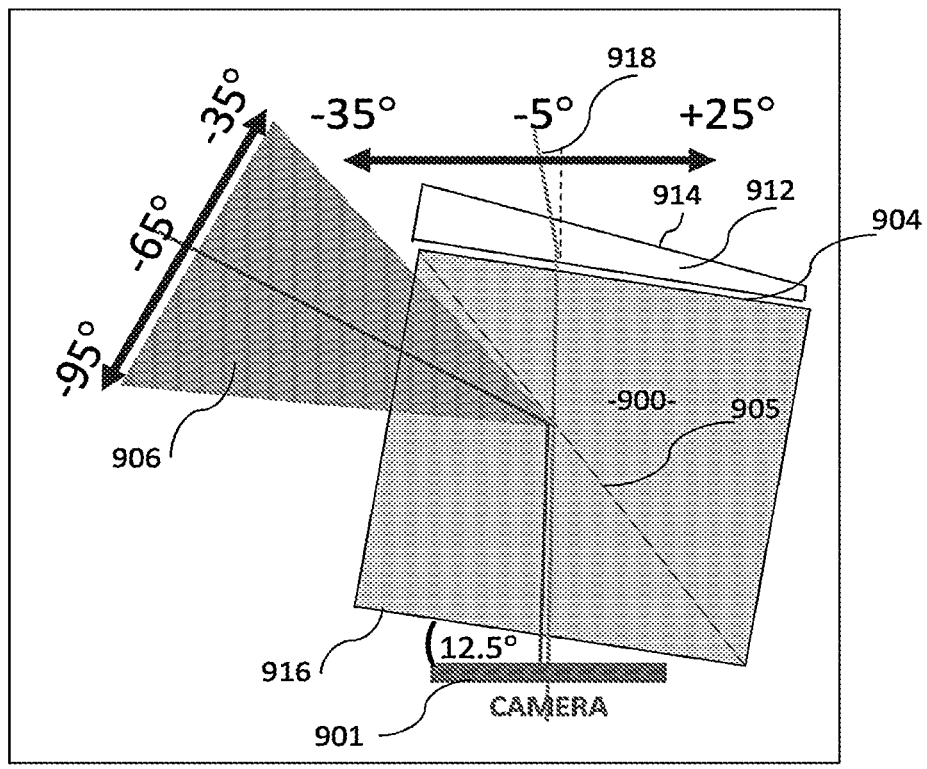

In a different example embodiment, shown in FIG. 9(b), a wedge prism 912 is placed over the top surface 904. In FIG. 9(b) the CBS 900 is tilted at 12.5° relative to the camera 901. Now the upper and lower glass surfaces 914, 916 are not parallel and the DOV 918 (and hence the associated FOV) from the top surface 904 is tilted towards negative angles by 5° by refraction, i.e. towards the FOV 906 from the side face 908. The use of a wedge prism 912 means that there is less chromatic distortion seen in the FOV through the top surface, as the angle of incidence to the central inclined boundary 905 of the CBS 900 is increased.

Figure 9C:
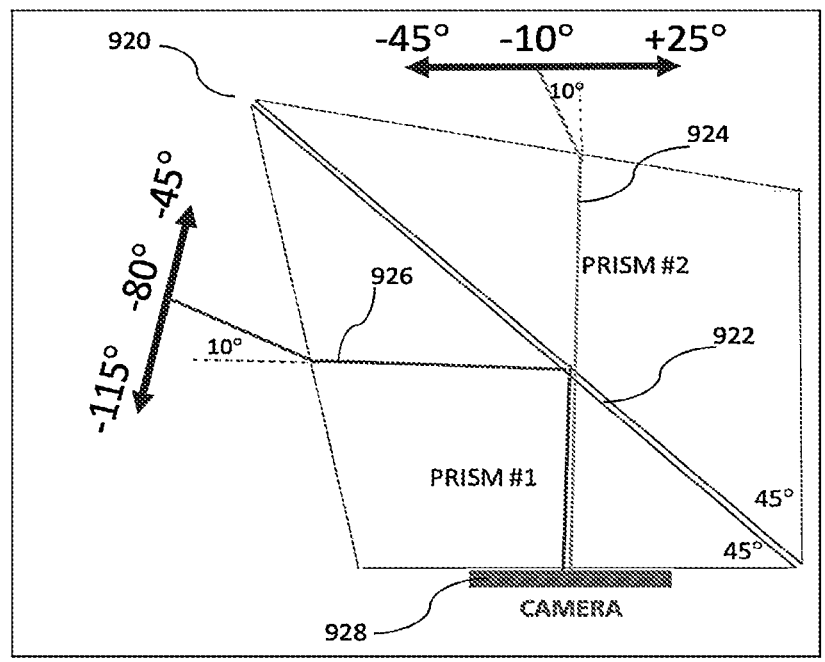

FIG. 9(c) shows a different geometry of a non-cubic beam splitter 920 which makes use of the same principles described above for FIGS. 9(a) and (b). The central inclined boundary 922 between prism #1 and prism #2 is at an angle of 45°, as in a standard CBS. The shape of the two identical triangular prisms #1 and #2 is now scalene, that is, none of the sides (or angles) are the same. This geometry makes use of effectively adding a wedge prism to the top and left sides of a CBS, causing a 10° deflection (in this example) by refraction to the central rays 924, 926 entering camera 928, respectively. It is noted that the non-cubic beam splitter 920 in this example is not inclined relative to the camera 928. Rather than adding separate wedge prism to the top of a CBS, as in FIG. 9(b) to provide additional deflection, the same effect produced by effectively incorporating additional wedge prisms onto one or two sides of a CBS by instead using a non-cubic beam splitter, such as the non-cubic beam splitter 920 shown in FIG. 9(c), for use in different embodiments.

In the example shown in FIG. 9(c), for a camera FOV of 70°, the top DOV extends from a centre at −10°, to maxima of +25° and −45°. The left side FOV extends from a centre at −80°, to maxima of −45° and −115°. The two FOV are now contiguous, whereas a standard CBS would leave a gap of 20° between the two FOV. Other variations on this geometry are possible, depending on the camera FOV, for use in different embodiments.

It is noted that, on the other hand, FIGS. 9(a) and (b) and (c) highlight the advantage of the N-CBS 319 in FIG. 3(b), 4(b) for a medium FOV of 60° where there is no chromatic distortion, since the entrance (and exit) central rays from both entrance surfaces are perpendicular to the surface.

Figure 10:
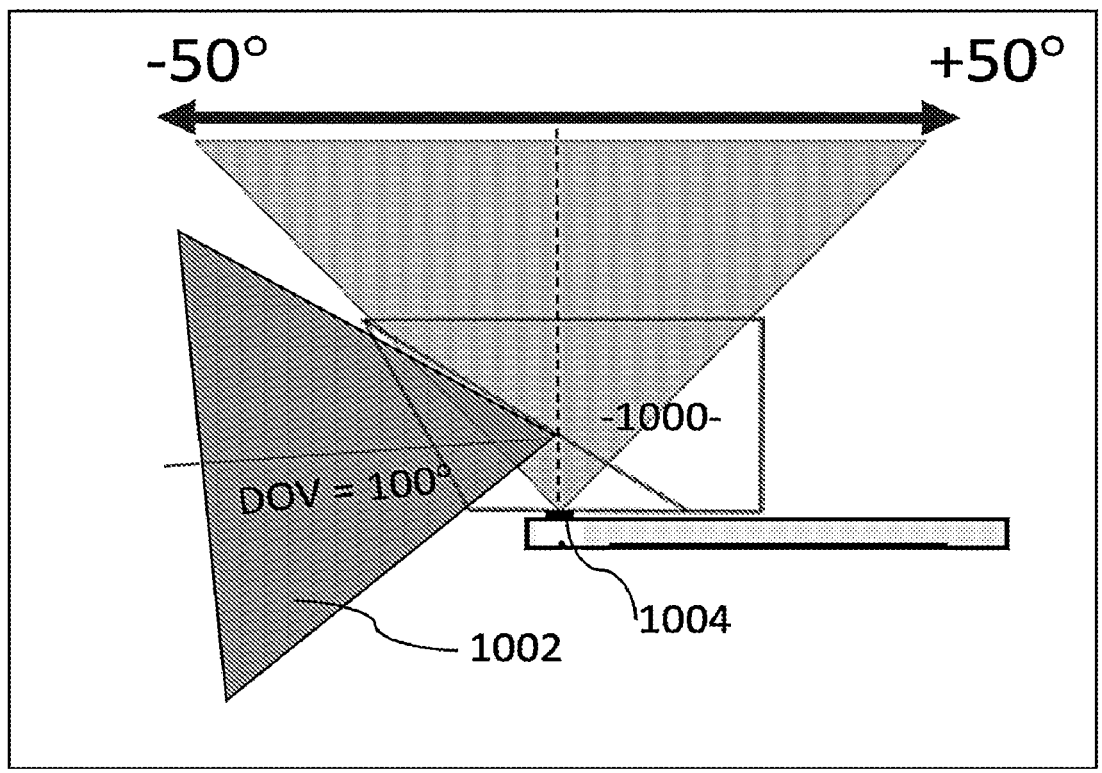
FIG. 10 is a schematic drawing illustrating the N-CBS prism arrangement from FIG. 3(d) for wide angle FOV, greater than 90°, for use in an example embodiment.

FIG. 10 shows how a very wide FOV can be utilized with the N-CBS 323 geometry shown in FIG. 3(d), labelled 1000 in FIG. 10. For such wide FOV one cannot see the full FOV from the side view 1002 owing to the limited acceptance angle of the N-CBS 1000 prism geometry, typically around 70 to 80°. For larger FOV there is usually some truncation of the FOV from the side view 1002. Furthermore, one should preferably take carefully into account the location of the camera 1004 with respect to the camera body edge, prism size etc.

The above description has focused on the ability to view two directions using one N-CBS and other variations from the family of N-CBS in FIG. 3 according to different example embodiments. It is possible to extend this principle to view three or more DOV in various embodiments. In the following, the description focuses on what may be achieved using two or more standard CBS, though any of the N-CBS family in FIG. 3 could be incorporated as required in different embodiments. Consider FIG. 11(a) which shows a single CBS 1100 which can be used to view through the left-hand side face (arrow 1102) or the top face, FOV 1104. The narrow camera FOV 1104 is indicated by the angular width of the cone. So long as the cone fits inside the CBS 1100 top surface 1105 then the CBS 1100 is not limiting the FOV 1104. Now consider FIG. 11(b) where a second, identical CBS 1106 is placed on top of the first CBS 1100, facing the opposite direction. Now there is a third DOV which the camera can view, indicated by the arrow 1107. It is noted that this arrangement 1108 uses three light shutters (not shown) placed over each entrance face for the combined CBS arrangement 1108, with only one being opened at once.

However, the FOV 1104a as viewed through the top surface 1110 of the upper CBS 1106 is truncated since not all the angular cone of light can fit into the top surface 1110. The limitation can be avoided in the embodiment as shown FIG. 11(c) using a progressively larger CBS e.g. 1112 for every increment in height of the overall combined CBS arrangement 1114. Now the same FOV 1104 fits inside the upper surface 1116 and so it is not truncated. FIG. 11(d) shows a proto-type example embodiment of this system being implemented with a CBS 1118 of 10 mm side length on top of the camera 1120 aperture, and a CBS 1122 of 20 mm side length on top of the CBS 1118.

FIG. 11(e) emphasizes that in this example embodiment, the three DOV 1123-1125 have a large angular separation since the deflection angle of the CBS is 90° and the FOV is much smaller than this. In the same basic arrangement of two CBS as in FIG. 11(c), the DOV 1200, 1202 of the side views can be made contiguous with that of the top surface DOV 1204 using secondary prisms 1206, 1208 attached to the respective side surfaces of the CBS 1210, 1212 respectively, as was described above with reference to FIG. 4(b), and as illustrated in FIGS. 12(a) and (b).

Figure 13:
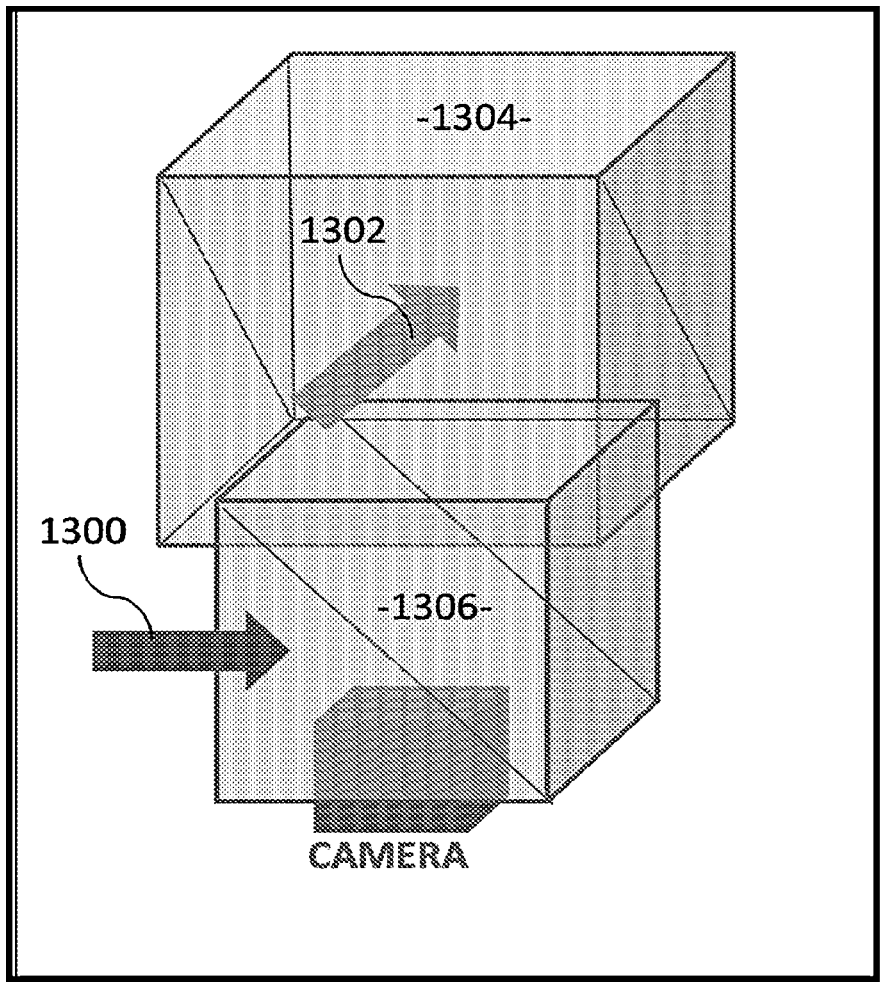
FIG. 13 is a schematic drawing illustrating the same geometry of stacked CBS as in FIG. 11(c), but rotating one of the CBS by 90°, for use in example embodiments.

Using the same basic arrangement of two CBS as in FIG. 11(c), the side views 1300, 1302 can be orthogonal to each other by rotating one of the CBS 1304 by 90 degrees relative to the CBS 1306, as shown in FIG. 13, so that its central join deflects light into the camera from an orthogonal plane.

The other factor which one should preferably take into account is the transmission/reflection ratio of each beam splitter interface. For just two directions, see e.g. FIG. 11(*a*), one typically wants a transmission/reflection ratio of 1:1, so that the side and top faces produces similarly intense views. For three directions, see e.g. FIGS. 11(*b*)-(*d*), one may choose a transmission/reflection ratio of the lower beam splitter to be 2:1 and that of the upper beam splitter to be 1:1, resulting in approximately equal intensity views along all three directions. This arrangement according to an example embodiment can, in principle be extended to more CBS stacked on top of each other, or even side-by-side, in different example embodiments. Such arrangements may also be implemented with different types of beam splitters such as plate beam splitters in different embodiments.

It has been described above how a stacked arrangement of two CBS could be used to view along three DOV according to example embodiment. This was found to work well for cameras with a narrow FOV owing to the long optical path length through the combined prism arrangement. Below, it is considered how three DOV can be implemented on a camera with a wider FOV, according to various embodiments.

Figure 14:
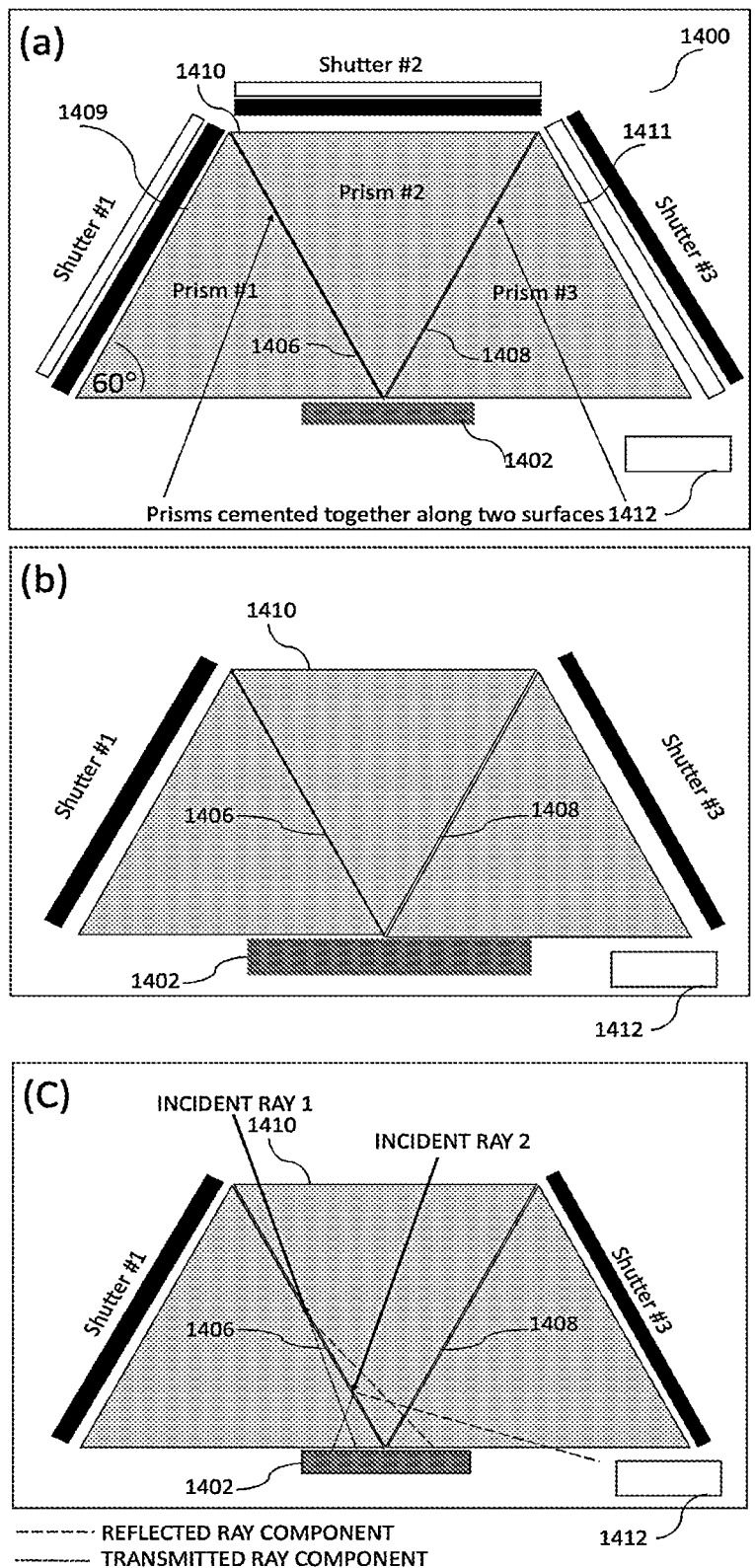
FIGS. 14 (b) and (c) are schematic drawings illustrating side shutters closed and only the top shutter is open, for the arrangement of FIG. 14(a).
Figure 14:
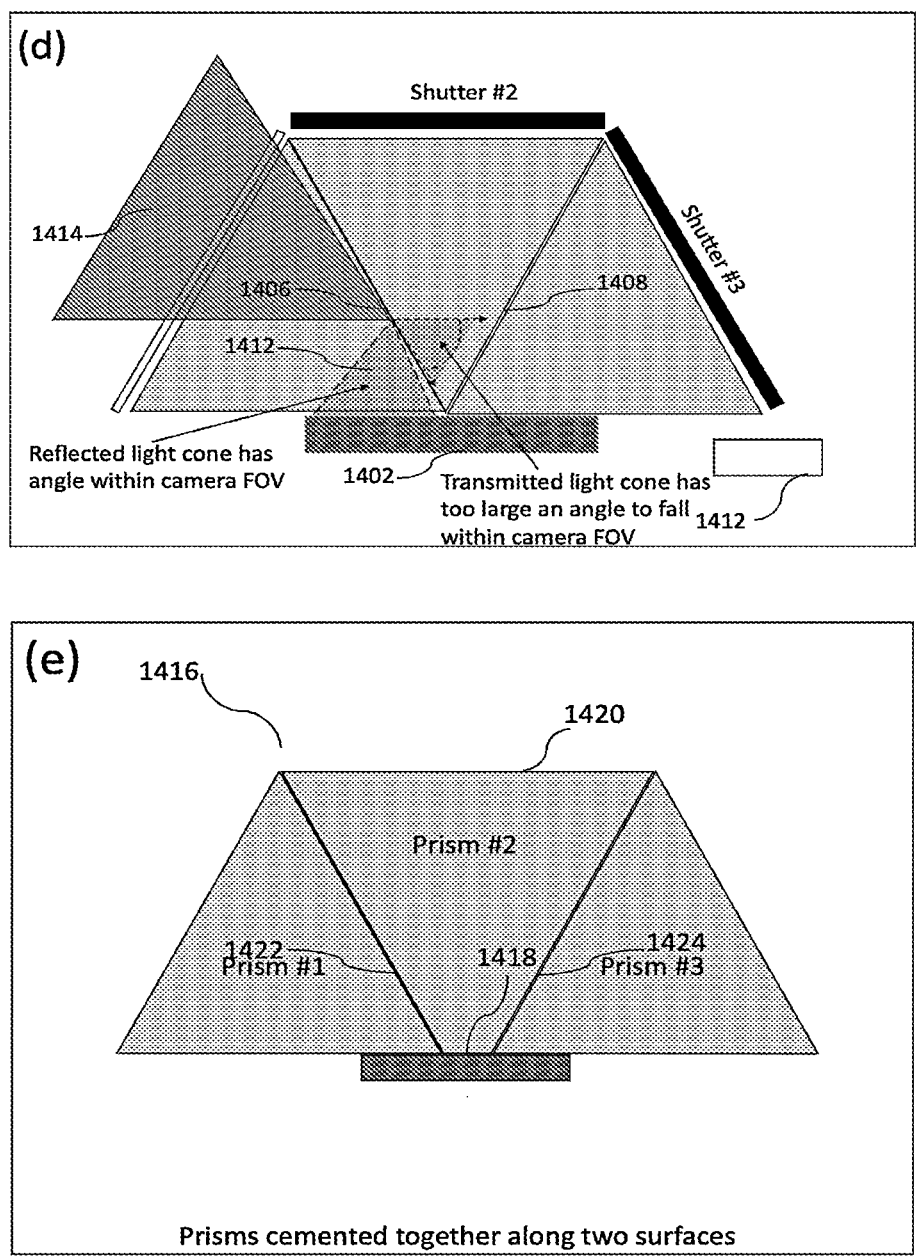

Consider the prism arrangement 1400 in FIG. 14(*a*) according to an example embodiment located on a camera 1402 aperture with a FOV of 60°. This arrangement 1400 combines three equilateral prisms #1-#3 together, with two joined interfaces, 1406, 1408 in comparison to a standard CBS or any of the N-CBS shown in FIG. 3 which only have one inclined interface. The joined interfaces 1406, 1408 are such that they transmit/reflect an equal ratio of light. There are now three entrance surfaces 1409-1411 for the combined prism arrangement 1400, one for each prism #1-#3, with separate light shutters #1-#3 over each. A control unit 1412 is provided and coupled to the shutters #1-#3 in the example embodiment. The control unit 1412 is configured to control to the shutters #1-#3, such that one is in an open state while the others are in a closed state. The control unit 1412 may also be configured to control the image recording and display.

Consider the situation when the two side shutters #1, #3 are closed and only the top shutter #2 is open so that light only enters through the top surface 1410, as shown in FIG. 14(*b*). 50% of incident light passes through the inclined interfaces 1406, 1408 and is incident on the camera 1402 sensor, forming an image with DOV=0°. The other 50% of light entering from the top surface 1410 is reflected off the inclined interfaces 1406, 1408, as shown in FIG. 14(*c*). Owing to the increase in reflected angle this light either falls outside the camera 1402 entrance aperture, or enters it with an angle greater than the camera 1402 FOV so does not contribute to the recorded image.

In FIG. 14(*d*) only the left-side shutter #1 is open. Now 50% of incident light is reflected from the inclined interface 1406 and falls on the camera 1402 aperture within an angular cone 1412 equal to the FOV 1414 so it is recorded by the camera 1402 sensor. The 50% of incident light which is transmitted through the interface 1406 continues undeflected with an angle outside the camera 1402 FOV, so even if it enters the camera 1402 aperture it does not contribute to the recorded image. Thus the full FOV 1414 is recorded from a DOV of −60°. The same argument applies for forming an image with a DOV of +60° when only the right-side shutter #3 is open. Thus a full, contiguous FOV over 180° can be viewed according to an example embodiment by opening the shutters sequentially, increasing the camera 1402 FOV by a factor of three in this example embodiment.

Depending on the relative sizes of the camera 1402 aperture and the FOV and the amounts of light required to reach the camera 1402 aperture from different DOV, the geometry 1416 as shown in FIG. 14(*e*) can also be used. Here the central prism #2 has a flat base 1418, allowing light from the top surface 1420 to enter it directly without passing through either of the inclined interfaces 1422, 1424.

For FOV larger or smaller than 60° the prism geometry 1400, 1416 can be tuned to allow the three FOV which can be joined into a continuous wide-angle composite view.

Figure 15:
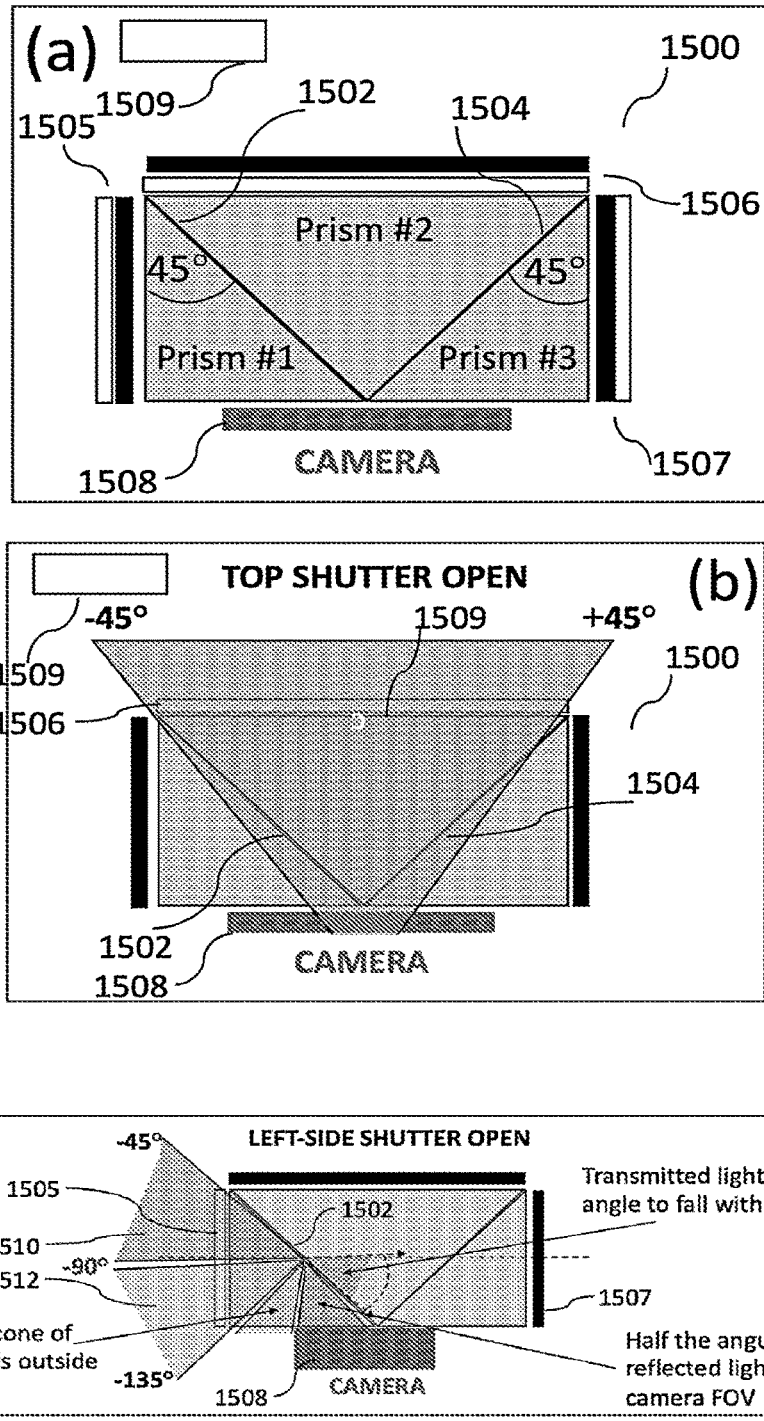
FIG. 15(a) is a schematic drawing illustrating an arrangement of three right-angle prisms, with three entrance surfaces, one for each prism, with separate light shutters over each, according to example embodiments. In this case, it is assumed the camera FOV is large, around 90°.
FIG. 15(b) is a schematic drawing illustrating side shutters closed and only the top shutter is open, for the arrangement of FIG. 15(a).
FIG. 15(c) is a schematic drawing illustrating only the left-side shutter open, for the arrangement of FIG. 15(2).

Using a similar principle, FIG. 15(*a*) shows a combined arrangement 1500 of three right-angle prisms #1 to #3. Here, prisms #1 and #3 are identical whereas prism #2 is a factor of √2 larger. As described above, there are two joined interfaces 1502, 1504, with an equal reflection/transmission ratio and three light shutters 1505-1507 over three entrance faces. In this case, it is assumed the camera 1508 FOV is large. A control unit 1509 is provided and coupled to the shutter 1505-1507 in the example embodiment. The control unit 1509 is configured to control the shutters 1505-1507. The control unit 1509 may also be configured to control the image recording and display.

First consider only the top shutter 1506 open, as shown in FIG. 15(*b*), allowing light into the top surface 1509 of the combined prism arrangement 1500. 50% of incident light is transmitted through the inclined interfaces 1502, 1504 and is incident on the camera 1508 sensor, forming an image centred on DOV=0°. The other 50% of light entering from the top surface is reflected off one or other of the inclined interfaces 1502, 1504 and owing to the increased angle acquired during reflection it either falls outside the camera 1508 entrance aperture, or enters it with an angle greater than the FOV so it does not contribute to image formation.

In FIG. 15(*c*) only the left-side shutter 1505 is open. Consider incident light from a DOV from −45° to −90° (1510). The 50% of light which is transmitted through the interface 1502 continues undeflected with an angle outside the camera 1508 FOV, so even it enters the camera 1508 aperture it does not contribute to the recorded image. The 50% of light which is reflected from the inclined interface 1502 falls on the camera 1508 aperture within the FOV so it is recorded.

Now consider incident light from larger, more negative angles, within a DOV from −90° to −135° (1512). Light which is reflected from the inclined interface 1502 falls outside the camera 1508 aperture so it is not recorded. Light which is transmitted through the inclined interface 1502 is not recorded. Therefore the camera 1508 sensor only records half the FOV from −45° to −90° and so one half of the sensor remains dark.

If the right-side shutter 1507 is opened at the same time as the left-side shutter 1505 then an image is recorded from a DOV from +45° to +90° and it fills the other half of the camera 1508 sensor which is not used to record anything from the left-side sensor. Thus a split FOV can be used to record two DOV comprising wide angle additions to the DOV from the top surface 1509 in FIG. 15(*b*).

There are also different embodiments of the prism arrangement 1500 shown in FIG. 15(*a*) to (*c*) which may incorporate a flat bottom for the central prism, as shown in FIG. 14(*e*).

Even if the camera's aperture and FOV are not exactly as described above, it is still possible to arrange the same split DOV view from the side entrance faces simply by limiting the angular cone of light entering such that it occupies only one half of the FOV and thus is only recorded on one half of the sensor, according to different embodiments.

Use of Mechanical Shutters

The shutters used in the embodiments described above to allow/block light from entering the surfaces of the various combined prism geometries are LC shutters. They do, however, have some drawback, including (i) low transmission ratio, i.e. the fraction of incident light when the shutter is in the open state. Owing to the necessary polarization of incident light, this immediately reduces the percentage transmission to typically less than 50%. (ii) limited rejection ratio, i.e. the fraction of incident light which the shutter transmits in the closed state compared to the open state. For low-cost LC shutters this is typically of the order of several hundred, for more expensive ones it be in the thousands. (iii) switching speed. Low cost LC shutters can switch their state on timescale of ten milliseconds, with higher costs one able to switch on timescales of less than 1 millisecond. (iv) variable angular response to rejecting light.

Owing to these drawbacks, various embodiments of the present invention may rely on the use of mechanical shutters rather than LC shutters. Mechanical shutters have certain advantages, such as (i) a higher transmission ratio, which is 100% as light does not pass through any medium before entering the prism, (ii) very high rejection ratio, since light is fully stopped in the shutter material. However, their disadvantages include cost, size, weight and geometry.

Use of Plate Beam Splitters and/or Mirrors

Prisms are well suited in embodiments of the present invention as applied to small aperture cameras, typically where the aperture size is only a few millimeters in diameter. For larger camera apertures, typically larger than 1 cm, as found on zoom lenses, DSLR cameras, binoculars, telescopic viewing, telescopes etc, the same function may be carried out using beam splitter plates or mirrors, which have the advantages of being lighter than solid prisms and may be rotated to incorporate a changeable direction of view.

Figure 16:
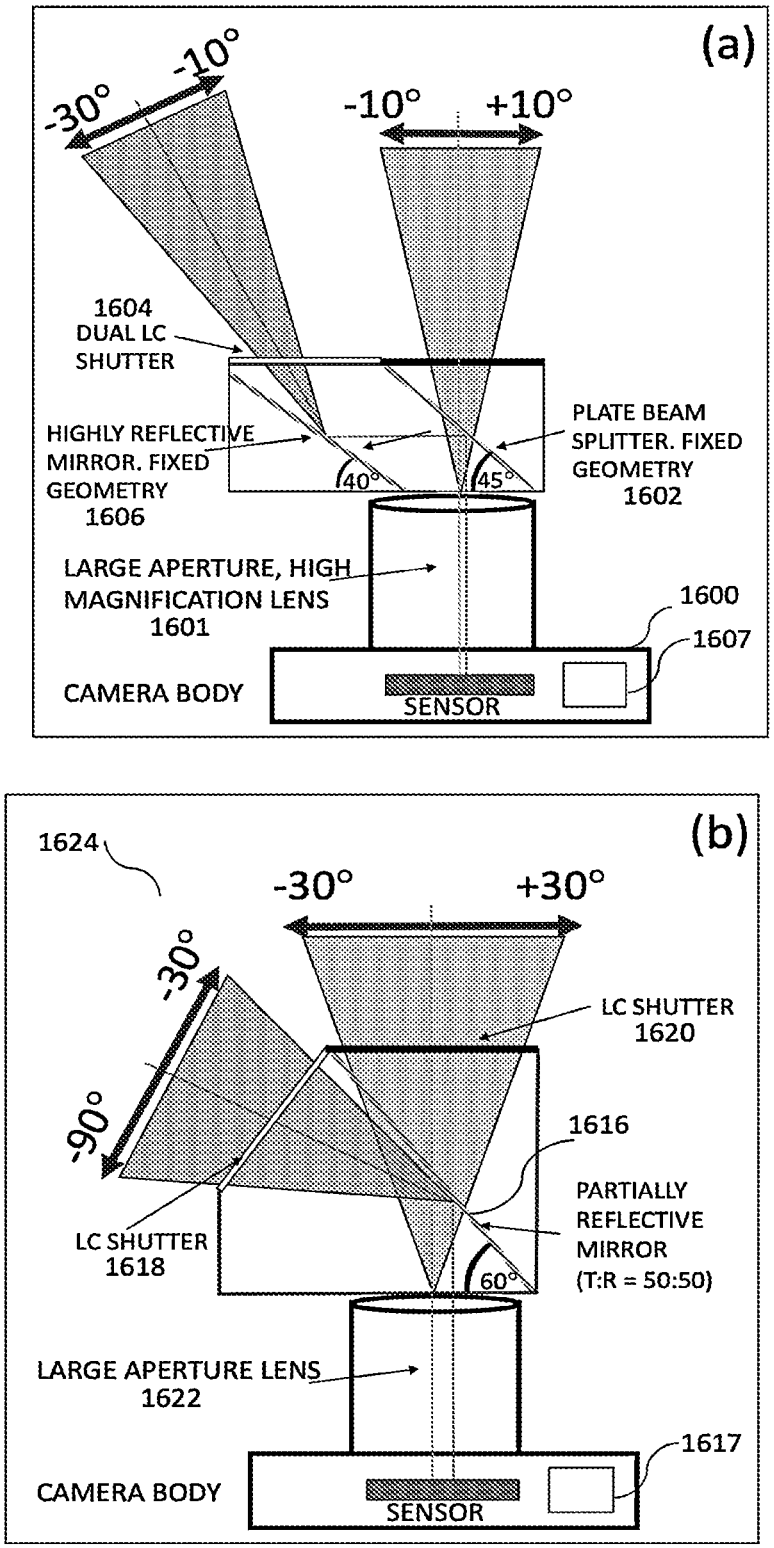
FIG. 16(a) is a schematic drawing illustrating another selectable DOV geometry for a large aperture, high magnification DSLR camera with a narrow FOV, according to an example embodiment, involving one fixed geometry plate beam splitter and a fixed geometry mirror.
FIG. 16(b) is a schematic drawing illustrating another geometry for a large aperture DSLR camera with a medium FOV, according to an example embodiment.

FIG. 16(a) shows an arrangement according to an example embodiment applied to a large aperture DSLR camera 1600. Owing to the large lens 1601 aperture it may not be practical to use solid glass prisms to define the deflection angles since it would be too heavy. Another option is to use a plate beam splitter 1602 instead of a CBS. One may choose a transmitted:reflected light ratio of 1:1 and so the situation is as described above for a standard CBS. A dual area light shutter 1604 allows light either straight into the camera lens 1601 from a DOV=0°, or from a DOV=-20° where it is first deflected by a highly reflective mirror surface 1606 towards the partially reflective beam splitter 1602, which then deflects it through 90° into the camera lens 1601. A control unit 1607 is provided and coupled to the dual area light shutter 1604 in the example embodiment. The control unit 1607 is configured to control the dual area light shutter 1604, such that one area is in an open state while the others are in a closed state, and vice versa. The control unit 1607 may also be configured to control the image recording and display.

FIG. 16(b) shows how a similar functionality as in FIG. 4(a) may be achieved according to an example embodiment using a single plate beam splitter 1616 in conjunction with two light shutters 1618, 1620 when arranged over a large aperture lens 1622 with a medium FOV of 60°. As in FIG. 4(a) there is a requirement to allow a second DOV which extends the FOV that is available through the straight-ahead direction. Here this is achieved using the plate beam splitter 1616, which has a transmitted:reflected light ratio of 1:1, and a fixed alignment angle of 60°. A control unit 1617 is provided and coupled to the light shutter 1618, 1620 in the example embodiment. The control unit 1617 is configured to control the light shutters 1618, 1620, such that one area is in an open state while the other area is in a closed state, and vice versa. The control unit 1617 may also be configured to control the image recording and display. When light is transmitted through the plate beam splitter 1616, with the right-side light shutter 1620 open and the left-side light shutter 1618 closed, then one views the straight-ahead direction. However, when light is reflected off the plate beam splitter 1616, with the right-side light shutter 1620 closed and the left-side light shutter 1618 open, then one views the side direction with a DOV=-60°. This arrangement 1624 whereby a single reflection is used, can be more appropriate to this larger FOV, where a double reflection arrangement like that in FIG. 16(a) can involve a significant loss of light through the longer path length. One may also choose to use the same arrangement 1624 geometry as in FIG. 16(b) but with a freely rotatable plate beam splitter in conjunction with the shutters, so that the DOV of the side view can be varied while the DOV of the straight ahead view preferably remains the same, compare also FIG. 9(a).

Use of X-Cubes to View Along Three Directions

X-cubes have similarities to beam splitter cubes but are made from four identically-shaped right angle prisms. They act to combine different colour images entering from three separate faces into a single composite image which is seen through a fourth face. Their action is thus similar to that of the beam splitter cubes as described herein for combining images from two entrance faces. The defining features of X-cubes though is that their action depends on different colours (red, green, blue) entering from three faces so they are not capable of combing full colour images. Certain embodiments may allow single wavelength images from three directions to be combined on the same sensor where they can be separated in software.

Figure 11:
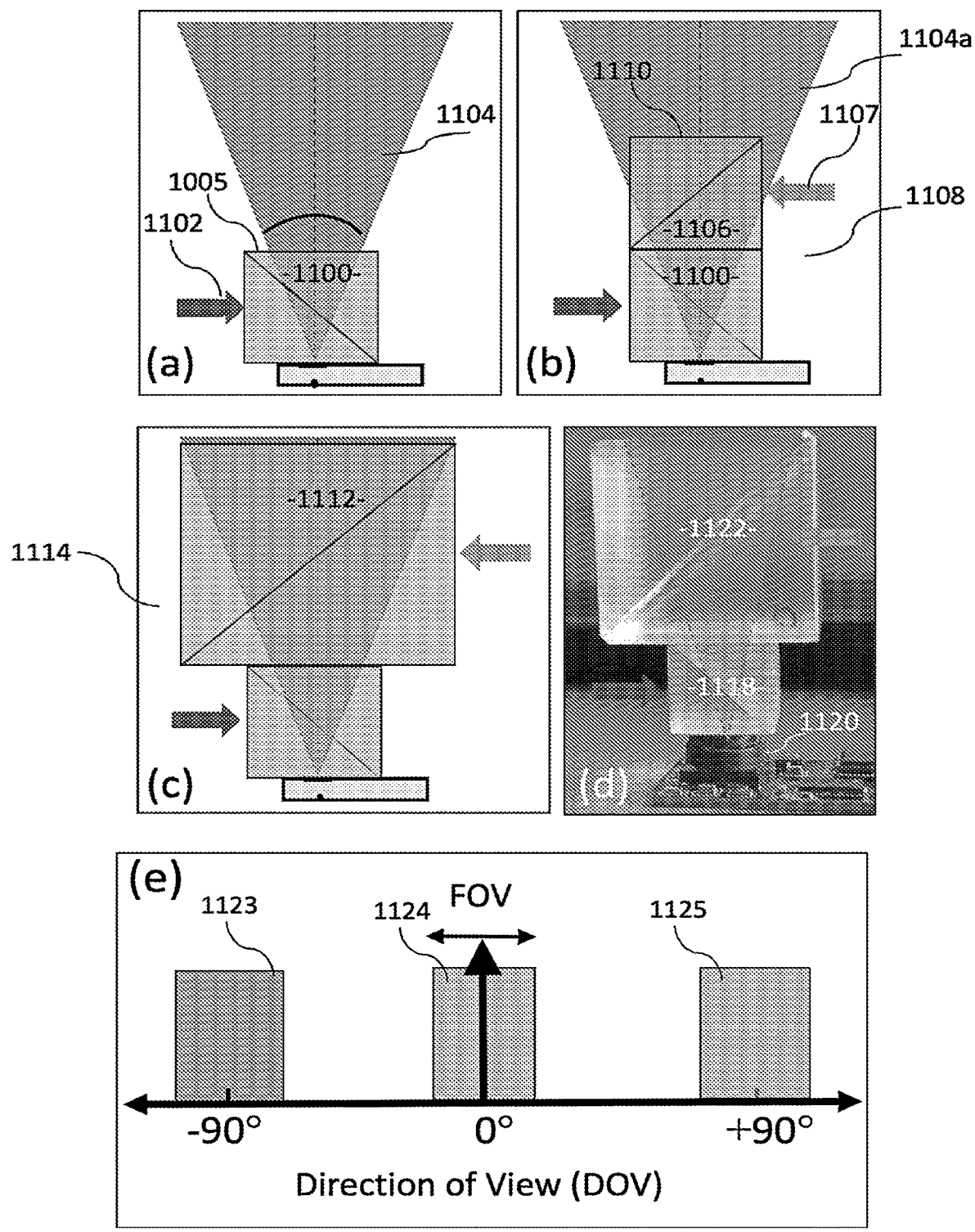
FIG. 11 illustrates stacking of CBS units to provide more than two DOV for use in example embodiments, specifically.
Figure 12:
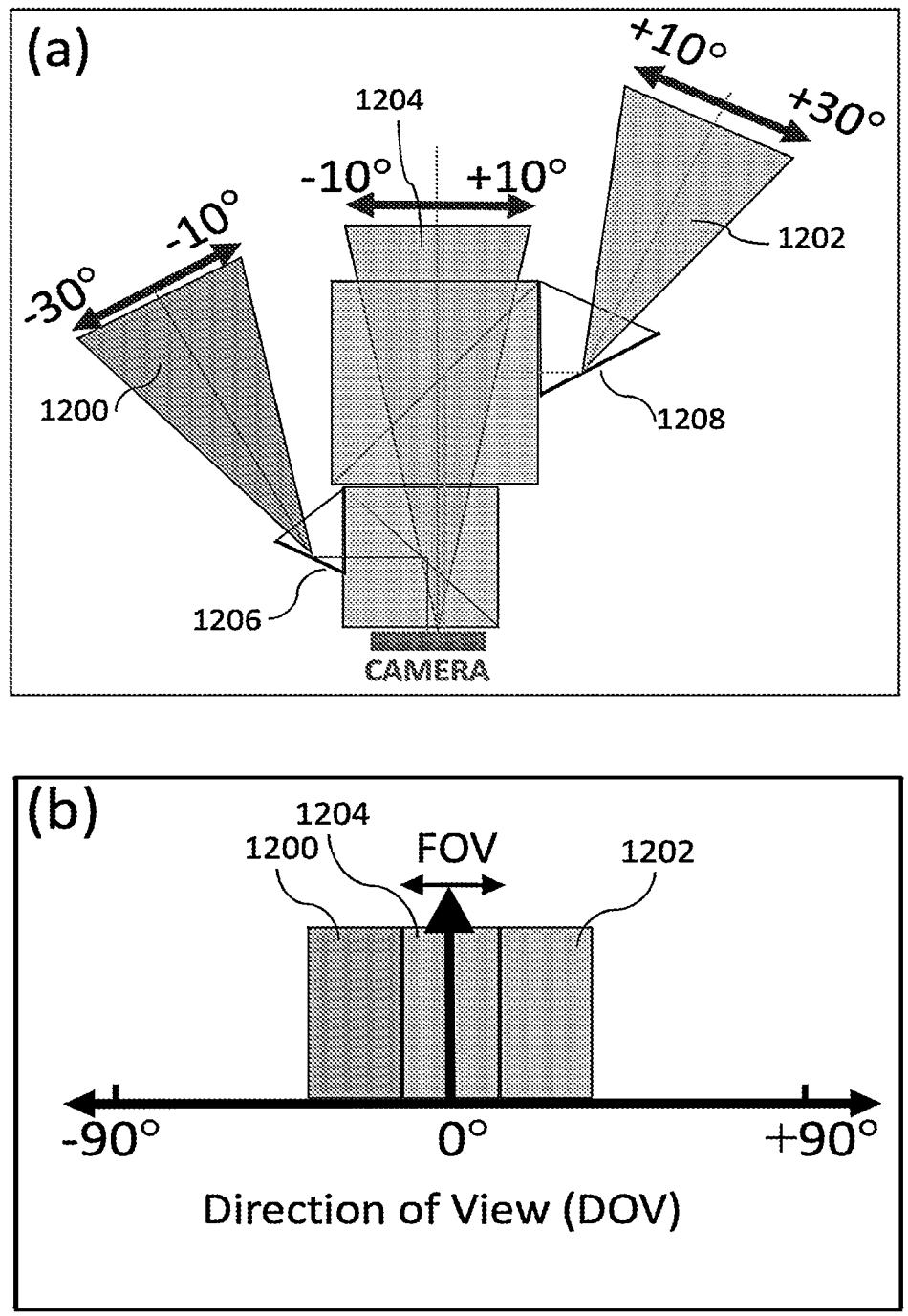
FIGS. 12 (a) and (b) illustrate the same geometry of stacked CBS as in FIG. 11(c), but now with secondary prisms attached to the CBS side surfaces so that net DOV is contiguous with that from the top surface, for use in example embodiments.

If one is able to tolerate a significant reduction in image intensity then a similar arrangement as that of a X-cube might be used to view in three orthogonal directions as in FIG. 11. This would involve removal of the red/green/blue colour filters which are present in a conventional X-cube and instead each internal interface is partially reflective, with a transmission:reflection ratio of 1:1 across the full visible spectrum. Each DOV would be formed by reflection off one internal interface and transmission through the other, with the other two DOV blocked by light shutters. Each DOV would thus only collect 25% of the incident light so is suited to operation in strong ambient lighting conditions.

In one embodiment, an assembly for switching direction of camera view is provided comprising a beam splitter element configured to be disposed on a camera; first and second shutter elements; and a control unit configured to be coupled to the first and second shutter elements; wherein the beam splitter element is configured such that first and second beams of light incident on first and second faces, respectively, of the beam splitter element are directable towards an entry lens of the camera; wherein the first and second shutter elements are configured to be disposed in the paths of the first and second beams of light, respectively; and wherein the control unit is configured to control the first and second shutter elements such that one of the first and second shutter elements is in an open state while the other one is in a closed state, and vice-versa.

The assembly may further comprise a first prism element configured to be disposed in the path of the first beam of light such that the first beam of light is deflected prior to being incident of the first face of the beam splitter element.

The assembly may further comprise a second prism element configured to be disposed in the path of the second beam of light such that the second beam of light is refracted prior to being incident of the second face of the beam splitter element.

The beam splitter element may be configured to be disposed at an angle relative to the entry lens of the camera.

The assembly may further comprise one or more further beam splitter elements configured to be disposed on the camera; and one or more further shutter elements; wherein each further beam splitter element is configured such that the second beam of light and a further beam of light incident on first and second faces, respectively, of the further beam splitter element are directable towards the entry lens of the camera; wherein each further shutter element is configured to be disposed in the path of the further beam of light; and wherein the control unit is further configured to be coupled to the one or more further shutter elements and to control the first, second and the one or more further shutter elements such that one or more of the first, second and the one or more further shutter elements is in the open state while at least one other one is in a closed state, and vice-versa.

A first further beam splitter element may be configured to be disposed adjacent the beam splitter element in a direction parallel to the plane of the entry lens of the camera. The beam splitter element and the first further beam splitter element may be integrally implemented as three or more interconnected prisms. The control unit may be configured to control the first, second and the first further shutter elements such that two of the first, second and the first further shutter elements are in the open state while at the remaining one is in a closed state, and vice-versa. The remaining shutter element may be configured to be disposed on a middle one of the three interconnected prisms. A middle one of the three interconnected prisms may comprise a flat base face opposite the second face of the beam splitter element and is configured to be disposed on the camera with the flat base facing the leans of the camera.

One or more second further beam splitter elements may be configured to the disposed above the beam splitter element in a direction perpendicular to the plane of the entry lens of the camera. The one or more second further beam splitter elements may be configured to be in a rotated orientation relative to the beam splitter element and/or to each other.

At least the beam splitter element may be configured such that respective fields of view from the first and second faces have a desired relative orientation. At least the beam splitter element may configured such that the respective fields of view from the first and second faces are substantially contiguous. At least the beam splitter element may be configured such that the respective fields of view from the first and second faces have a desired angular separation.

The assembly may further comprise two or more sets each comprising the beam splitter element and first and second shutter elements, the beam splitter elements of the respective sets being configured to be disposed on respective cameras. The control unit may be configured to control the first and second shutter elements of each set such that one of the first and second shutter elements of the first set is in an open state while the other one is in a closed state, and while one of the first and second shutter elements of the second set is in an open state while the other one is in a closed state.

At least the beam splitter element may comprise a cube beam splitter.

At least the beam splitter element may comprise a non-cube beam splitter.

The beam splitter element may be configured to be rotatable relative to the entry lens of the camera.

Figure 17:
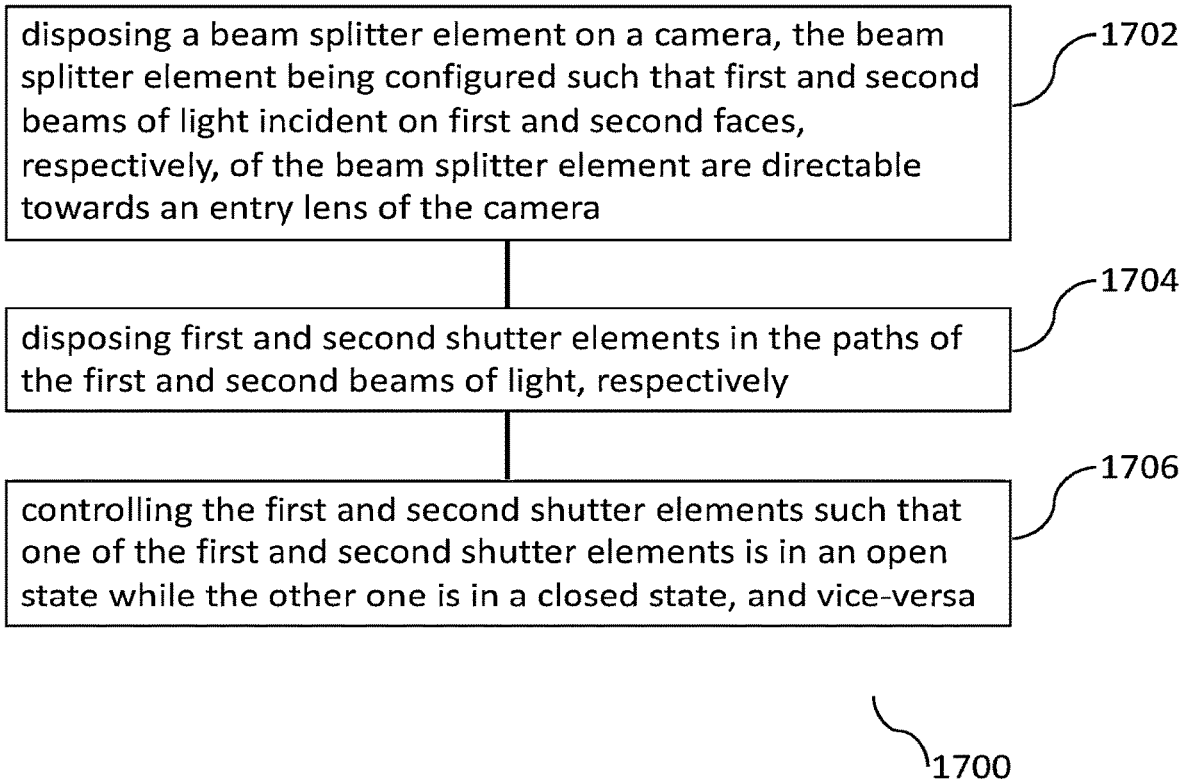
FIG. 17 shows a flowchart illustrating a method of switching direction of camera view, according to an example embodiment.

FIG. 17 shows a flowchart 1700 illustrating a method of switching direction of camera view, according to an example embodiment. At step 1702, a beam splitter element is disposed on a camera, the beam splitter element being configured such that first and second beams of light incident on first and second faces, respectively, of the beam splitter element are directable towards an entry lens of the camera. At step 1704, first and second shutter elements are disposed in the paths of the first and second beams of light, respectively. At step 1706, the first and second shutter elements are controlled such that one of the first and second shutter elements is in an open state while the other one is in a closed state, and vice-versa.

The method may further comprise disposing a first prism element in the path of the first beam of light such that the first beam of light is deflected prior to being incident of the first face of the beam splitter element.

The method may further comprise disposing a second prism element in the path of the second beam of light such that the second beam of light is refracted prior to being incident of the second face of the beam splitter element.

The beam splitter element may be configured to be disposed at an angle relative to the entry lens of the camera.

The method may further comprise disposing one or more further beam splitter elements on the camera, wherein each further beam splitter element is configured such that the second beam of light and a further beam of light incident on first and second faces, respectively, of the further beam splitter element are directable towards the entry lens of the camera; providing one or more further shutter elements, wherein each further shutter element is disposed in the path of the further beam of light; and controlling the first, second and the one or more further shutter elements such that one or more of the first, second and the one or more further shutter elements is in the open state while at least one other one is in a closed state, and vice-versa.

A first further beam splitter element may be disposed adjacent the beam splitter element in a direction parallel to the plane of the entry lens of the camera. The beam splitter element and the first further beam splitter element may be integrally implemented as three or more interconnected prisms. The method may comprise controlling the first, second and the first further shutter elements such that two of the first, second and the first further shutter elements are in the open state while at the remaining one is in a closed state, and vice-versa. The remaining shutter element may be disposed on a middle one of the three interconnected prisms. A middle one of the three interconnected prisms may comprise a flat base face opposite the second face of the beam splitter element and is disposed on the camera with the flat base facing the leans of the camera.

One or more second further beam splitter elements may be disposed above the beam splitter element in a direction perpendicular to the plane of the entry lens of the camera. The one or more second further beam splitter elements may be in a rotated orientation relative to the beam splitter element and/or to each other. At least the beam splitter element may be configured such that respective fields of view from the first and second faces have a desired relative orientation. At least the beam splitter element may be configured such that the respective fields of view from the first and second faces are substantially contiguous. At least the beam splitter element may be configured such that the respective fields of view from the first and second faces have a desired angular separation.

The method may comprise providing two or more sets each comprising the beam splitter element and first and second shutter elements, the beam splitter elements of the respective sets being configured to be disposed on respective cameras. The method may comprise controlling the first and second shutter elements of each set such that one of the first and second shutter elements of the first set is in an open state while the other one is in a closed state, and while one of the first and second shutter elements of the second set is in an open state while the other one is in a closed state.

At least the beam splitter element may comprise a cube beam splitter.

At least the beam splitter element may comprise a non-cube beam splitter.

The beam splitter element may be configured to be rotatable relative to the entry lens of the camera.

Aspects of the systems and methods described herein, such as, but not limited to, the control units for the shutters and/or the image recording and displaying in the described example embodiments various may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. An assembly for switching direction of camera view comprising:
   a beam splitter element configured to be disposed on a camera;
   first and second shutter elements; and
   a control unit configured to be coupled to the first and second shutter elements;
   wherein the beam splitter element is configured such that first and second beams of light incident on first and second faces, respectively, of the beam splitter element are directable towards an entry lens of the camera;
   wherein the first and second shutter elements are configured to be disposed in the paths of the first and second beams of light, respectively; and
   wherein the control unit is configured to control the first and second shutter elements such that one of the first and second shutter elements is in an open state while the other one is in a closed state, and vice-versa;
   the assembly further comprising
   one or more further beam splitter elements configured to be disposed on the camera; and
   one or more further shutter elements;
   wherein each further beam splitter element is configured such that the second beam of light and a further beam of light incident on first and second faces, respectively, of the further beam splitter element are directable towards the entry lens of the camera;
   wherein each further shutter element is configured to be disposed in the path of the further beam of light; and
   wherein the control unit is further configured to be coupled to the one or more further shutter elements and to control the first, second and the one or more further shutter elements such that one or more of the first, second and the one or more further shutter elements is in the open state while at least one other one is in a closed state, and vice-versa.

2. The assembly of claim 1, further comprising a first prism element configured to be disposed in the path of the first beam of light such that the first beam of light is deflected prior to being incident of the first face of the beam splitter element.

3. The assembly of claim 2, further comprising a second prism element configured to be disposed in the path of the second beam of light such that the second beam of light is refracted prior to being incident of the second face of the beam splitter element.

4. The assembly of claim 1, wherein the beam splitter element is configured to be disposed at an angle relative to the entry lens of the camera.

5. The assembly of claim 1, wherein a first further beam splitter element is configured to be disposed adjacent the beam splitter element in a direction parallel to the plane of the entry lens of the camera.

6. The assembly of claim 1, wherein a first further beam splitter element is configured to the disposed above the beam splitter element in a direction perpendicular to the plane of the entry lens of the camera.

7. The assembly of claim 1, wherein at least the beam splitter element is configured such that respective fields of view from the first and second faces are substantially contiguous or have a desired angular separation.

8. The assembly of claim 1, comprising a further beam splitter element and third and fourth shutter elements, the further beam splitter element-being configured to be disposed on a further camera.

9. The assembly of claim 1, wherein the beam splitter element is configured to be rotatable relative to the entry lens of the camera.

10. A method of switching direction of camera view comprising:
    disposing a beam splitter element on a camera, the beam splitter element being configured such that first and second beams of light incident on first and second faces, respectively, of the beam splitter element are directable towards an entry lens of the camera;
    disposing first and second shutter elements in the paths of the first and second beams of light, respectively; and
    controlling the first and second shutter elements such that one of the first and second shutter elements is in an open state while the other one is in a closed state, and vice-versa;
    the method further comprising:
    disposing one or more further beam splitter elements on the camera, wherein each further beam splitter element is configured such that the second beam of light and a further beam of light incident on first and second faces, respectively, of the further beam splitter element are directable towards the entry lens of the camera;
    providing one or more further shutter elements, wherein each further shutter element is disposed in the path of the further beam of light; and
    controlling the first, second and the one or more further shutter elements such that one or more of the first, second and the one or more further shutter elements is in the open state while at least one other one is in a closed state, and vice-versa.

11. The method of claim 10, further comprising disposing a first prism element in the path of the first beam of light such that the first beam of light is deflected prior to being incident of the first face of the beam splitter element.

12. The method of claim 11, further comprising disposing a second prism element in the path of the second beam of light such that the second beam of light is refracted prior to being incident of the second face of the beam splitter element.

13. The method of claim 10, wherein the beam splitter element is configured to be disposed at an angle relative to the entry lens of the camera.

14. The method of claim 10, wherein a first further beam splitter element is disposed adjacent the beam splitter element in a direction parallel to the plane of the entry lens of the camera.

15. The method of claim 10, wherein a first further beam splitter element is disposed above the beam splitter element in a direction perpendicular to the plane of the entry lens of the camera.

16. The method of claim 10, wherein at least the beam splitter element is configured such that respective fields of view from the first and second faces are substantially contiguous or have a desired angular separation.

17. The method of claim 10, comprising providing a further-beam splitter element and third and fourth shutter elements, the further beam splitter element-being configured to be disposed on a further camera.

18. The method of claim 10, wherein the beam splitter element is configured to be rotatable relative to the entry lens of the camera.

* * * * *